US006947069B1

(12) United States Patent
Elberbaum

(10) Patent No.: US 6,947,069 B1
(45) Date of Patent: Sep. 20, 2005

(54) METHOD AND APPARATUS FOR CONNECTING FIBER OPTIC LINES TO AN INFORMATION TRANSMISSION LINE CARRYING TWO WAY SIGNALS

(75) Inventor: David Elberbaum, Tokyo (JP)

(73) Assignee: Elbex Video Ltd., Tokyo (JP)

( * ) Notice: Subject to any disclaimer, the term of this patent is extended or adjusted under 35 U.S.C. 154(b) by 0 days.

(21) Appl. No.: 09/041,550

(22) Filed: Mar. 12, 1998

(51) Int. Cl.$^7$ ............................. H04N 5/04; H04N 9/44; H04N 9/475
(52) U.S. Cl. ..................... 348/50; 348/518; 348/519; 348/705
(58) Field of Search ................ 348/500, 518–519, 348/705; H04N 5/04, 9/44, 9/475

(56) References Cited

U.S. PATENT DOCUMENTS

| | | | | |
|---|---|---|---|---|
| 4,943,864 A | * | 7/1990 | Elberbaum | 348/159 |
| 5,249,051 A | * | 9/1993 | Elberbaum et al. | 348/521 |
| 5,267,039 A | * | 11/1993 | Elberbaum | 348/476 |
| 5,293,231 A | * | 3/1994 | Elberbaum et al. | 348/521 |
| 5,579,060 A | * | 11/1996 | Elberbaum | 348/705 |
| 5,592,325 A | * | 1/1997 | Elberbaum | 398/45 |
| 5,751,368 A | * | 5/1998 | Cooper | 348/512 |
| 5,835,155 A | * | 11/1998 | Jennes et al. | 348/536 |
| 5,892,605 A | * | 4/1999 | Stevens | 398/55 |
| 6,191,814 B1 | * | 2/2001 | Elberbaum | 348/211.14 |
| 6,493,034 B1 | * | 12/2002 | Elberbaum | 348/512 |
| 6,646,677 B2 | * | 11/2003 | Noro et al. | 348/156 |
| 6,704,057 B1 | * | 3/2004 | Ueda | 348/460 |
| 2002/0152557 A1 | * | 10/2002 | Elberbaum | 8/405 |

* cited by examiner

Primary Examiner—Brian P. Yenke
(74) Attorney, Agent, or Firm—Katten Muchin Rosenman

(57) ABSTRACT

In a method and apparatus for connecting fiber optic lines and a fiber optic receiver and a fiber optic transmitter in an information transmission system carrying information signals propagated from a transmitter to a receiver in one direction and an external synchronizing signal from the receiver to the transmitter in the opposite direction, a fiber optic receiver includes a circuit for receiving an optical information signal from the transmitter and converting that signal into an electrical signal which is processed into an information signal outputted to the transmission line via a common connector. A pulse signal transmitted to the fiber optic receiver is retrieved and separated from the information signal. The pulse signal is an external synchronizing signal having a voltage level higher than the maximum level or lower than the minimum voltage level of the video signal. The pulse signal is injected into the information transmission line or the fiber optic line. Another circuit processes the separated pulse signal and converts it into an optical signal emitted through one or more fiber optic lines or cables towards the transmitter. The fiber optic transmitter includes a circuit which receives an information signal from the transmitter. This signal is converted into an optical signal emitted through the fiber optic cables to the receiver.

241 Claims, 11 Drawing Sheets

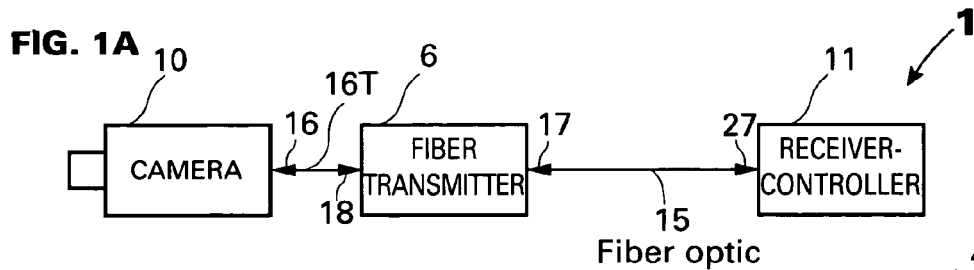
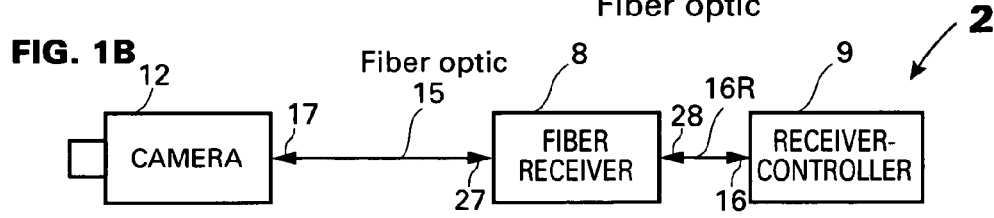
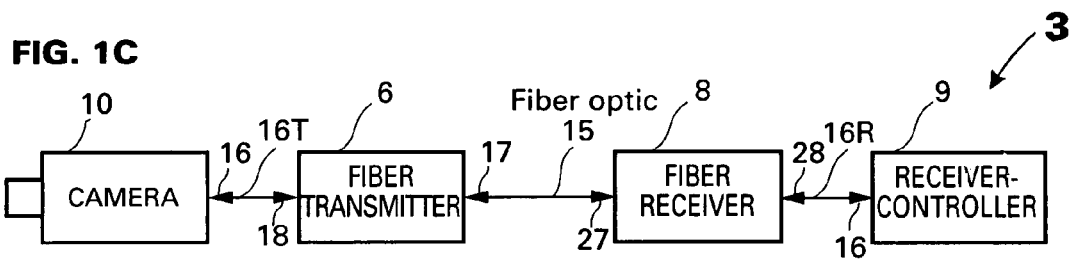
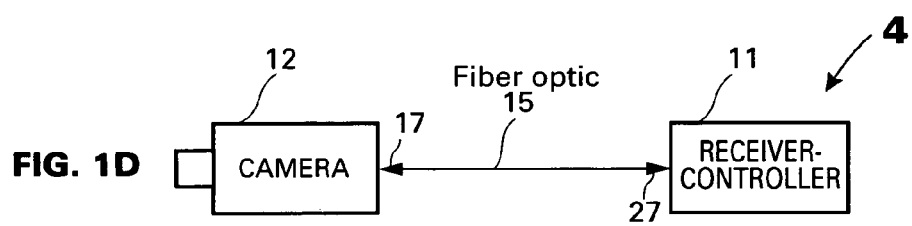
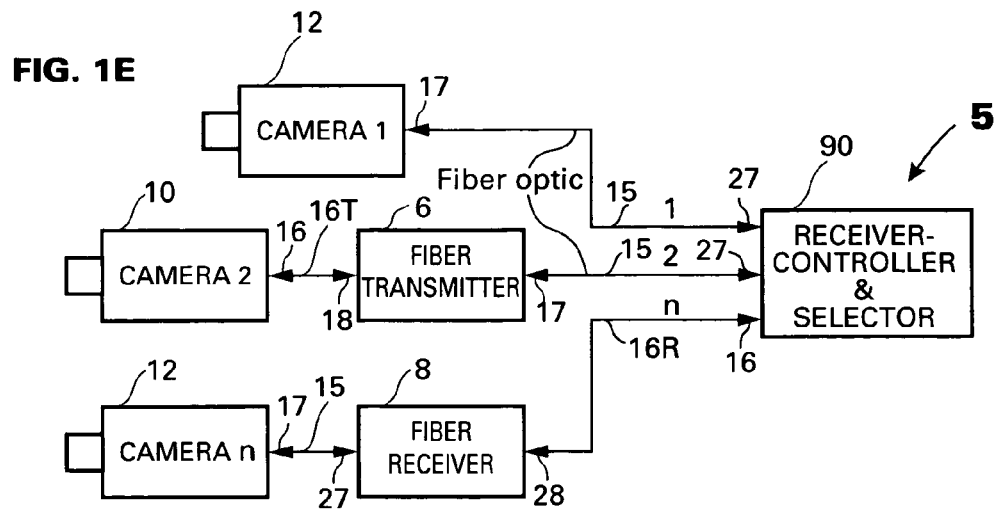

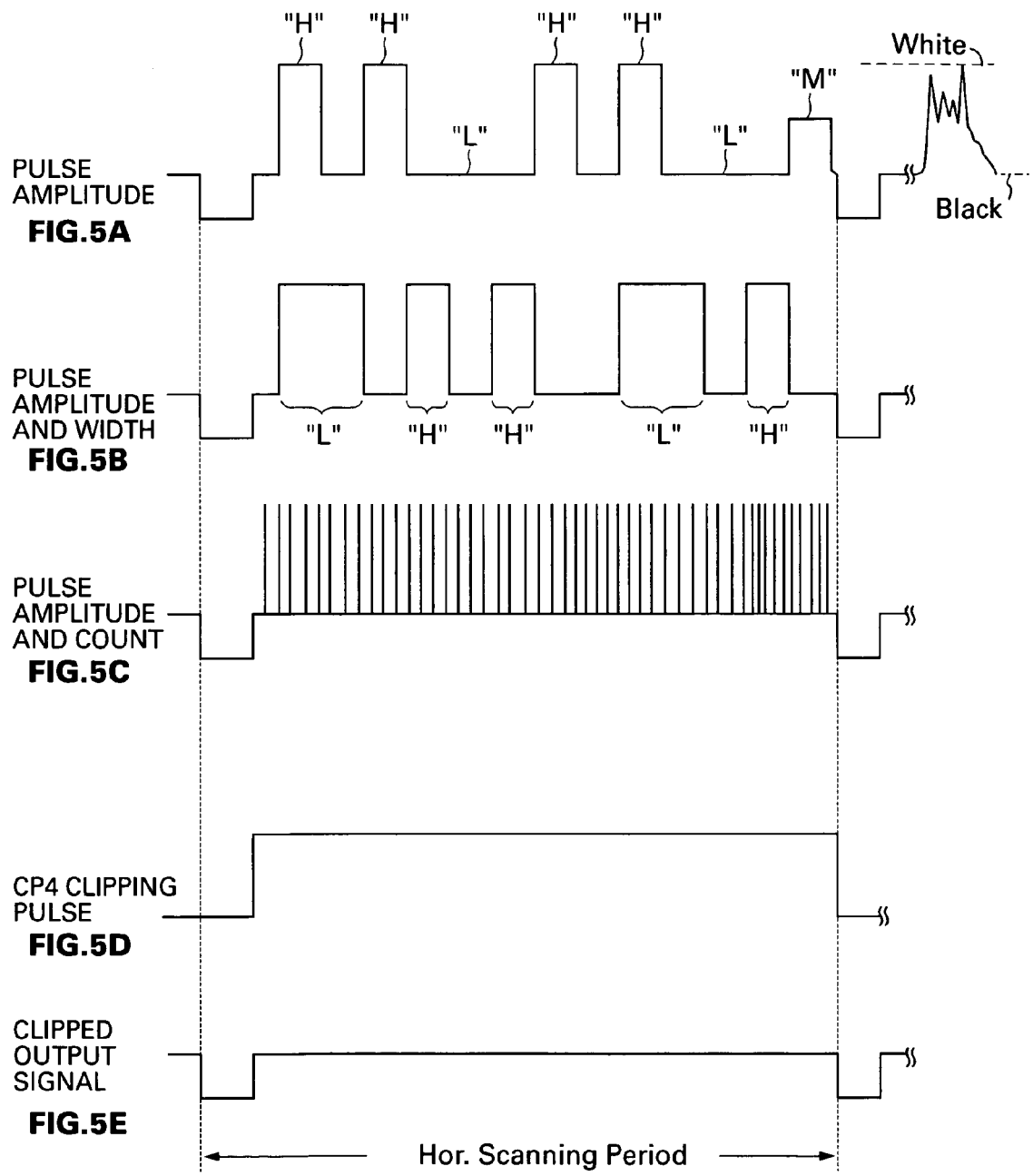

METHOD AND APPARATUS FOR CONNECTING FIBER OPTIC LINES TO AN INFORMATION TRANSMISSION LINE CARRYING TWO WAY SIGNALS

BACKGROUND OF THE INVENTION

1. Field of the Invention

This invention relates to a method and apparatus for injecting external synchronizing signals and control signals into a fiber optic transmission line, carrying information signals propagated from a remotely located transmitter, for feeding the injected signals to the transmitter in the reverse direction to the information signal propagation, through the same fiber optic transmission line.

2. Description of the Prior Art

In a closed circuit television system used as an information transmission system, a television camera or a plurality of cameras are connected through a single or multiple transmission lines to a monitoring station. Such television cameras may incorporate remotely controlled repositioning devices for the camera's pan, tilt or its zoom lens. The cameras may also provide other remotely controlled functions such as wiper, washer, heater and illuminator and have various circuits that are remotely set by a control commands generated from the monitoring station.

Some of the remote controlling methods for various camera functions employ AC or DC controls through multi control cables; others employ digital command codes transmitted via twisted pair wires or fiber optics cable. Yet, other methods for transmitting control command codes to a television camera via the video coaxial cable that carries the information signals are disclosed in U.S. Pat. Nos. 4,989,085; 5,335,014 and 5,579,060, the entire contents of which are incorporated herein by reference.

When a plurality of television cameras are connected to a monitoring station via a plurality of transmission lines the transmission lines are connected to a switcher for selectively displaying a camera on a television monitor. When a closed circuit television system does not employ external synchronization for its television cameras the selected images displayed on the monitor are often disturbed during and immediately after the switching-over from one television camera to another. Therefore, it is preferable to externally synchronize all the cameras of such a system in order to ensure a flawless switchover from one camera to another, with no disturbance of the displayed picture during and immediately after the switchover.

As one of the devices for synchronizing a plurality of television cameras, there is a well known apparatus for transmitting a vertical synchronizing signal and a horizontal synchronizing signal or a composite synchronizing signal used in a television system. Another well known apparatus is the apparatus for transmitting a vertical drive signal and a horizontal drive signal, and driving the television camera and its deflection/timing circuits by the transmitted vertical drive signals and the horizontal drive signals.

In any of the above known devices of the type under discussion, as the transmitted synchronizing signal itself is a train of pulses, which can be easily influenced by noise, the transmission of a synchronizing signal requires the use of an exclusive coaxial cable with its high shielding effect, or exclusive fiber optics cable which makes it costly and complex, particularly for the systems with a plurality of television cameras.

Another known method and apparatus for synchronizing a plurality of television cameras, is a method and apparatus for transmitting an external synchronizing signal from an external synchronizing generator to the television cameras by injecting the external synchronizing signal into the video signal transmission line and locking an internal synchronizing signal generator of the television camera by means of the transmitted external synchronizing signal. Such an apparatus is disclosed in U.S. Pat. No. 4,603,352 the entire contents of which are incorporated herein by reference.

Some fiber optic transmission lines used for propagating video signals are also used for propagating two way signals, such as external synchronizing signals or digital control signals in the reverse direction to the video propagation; however, the devices for operating such fiber optics transmission lines require exclusive input and output terminals at both ends of the fiber optic line for the applied external sync or the control signals, which are in addition to the video input and output terminals at both ends of the fiber optic transmission line. Therefore the method and apparatuses for feeding external synchronizing and control signal via the video coaxial cables referred to above cannot be applied to such fiber optics transmission lines.

SUMMARY OF THE INVENTION

An object of the present invention is to provide for connecting a transmission line such as coaxial cable or twisted pair wires, carrying two way signals, an information signal from a transmitter in one direction and external synchronizing signals and/or control signals to the transmitter in the opposite direction, with a fiber transmitter of a fiber optic line through common terminals for the two way signals.

The term "fiber optic line" used throughout the application means a single fiber optic cable connected to two way fiber optic transceiver at its both ends; of which the one transceiver that connects and interfaces the fiber optic cable with a transmitter is termed "fiber optic transmitter" and the other transceiver that connects and interfaces the fiber optic cable with a receiver is termed "fiber optic receiver" throughout the application.

Another object of the present invention is to provide for connecting a transmission line such as coaxial cable or twisted pair wires, carrying two way signals, an external synchronizing signal and/or control signals from a receiver-controller in one direction and information signals to the receiver-controller in the opposite direction, with fiber receiver of a fiber optic line through a common terminal for the two way signals.

Further object of the present invention is to insert and connect a fiber optic line in between two sections of a transmission line, such as coaxial cable or twisted pair wires; one section the transmission line is connected to a transmitter and the other to a receiver-controller with both sections of the transmission line carrying two way signals, information signals to the receiver in one direction and external synchronizing signals and/or a control signal to the transmitter in the opposite direction, whereby each end of the fiber optic line is connected to one transmission line through common terminals for the two way signals.

According to the present invention when a fiber optic line is introduced in and connected to an information transmission line such as a coaxial cable or twisted pair wires, it will propagate the two way signals in the same manner as the coaxial cable or the twisted pair wires do.

Yet another object of the present invention is to provide for directly connecting a fiber optic cable to a transmitter at one end of the cable and to a receiver-controller at the other end, for propagating two way signals, and information signal from the transmitter to the receiver-controller and external synchronizing signals, and/or control signals from the receiver-controller to the transmitter.

A method for connecting fiber optic lines to an information transmission line carrying two way signals comprises the steps of separating the external synchronizing signals and/or the control signal from the combined signals present at the output connector of the fiber receiver on the basis of signal levels and/or signal timing and re-inject the separated signals to a driver circuit that feeds optical signals into the fiber optic connector of the fiber optic receiver. This is followed by the steps of retrieving the external synchronizing and/or the control signals from the fiber optic connector of the fiber transmitter and re-injecting the retrieved external synchronizing signals and/or control signals into the input connector of the fiber transmitter, thereby completing the transfer of the external synchronizing and/or control signals from the fiber optic receiver output connector to the fiber transmitter input connector.

The apparatus of the present invention comprises one or more video signal generating means, such as television cameras, respectively connected to one or more information transmission lines or fiber optic lines for feeding the video signal to one or more receiving means. Each video signal generating means includes an internal synchronizing signal generation circuit for generating an internal synchronizing signal synchronized with the external synchronizing signal.

According to the present invention, the external synchronizing signal is a pulse signal having a voltage level higher than the maximum voltage level or lower than the minimum voltage level of the video signal. The receiving means includes a circuit for injecting the external synchronizing signal into the information transmission line or the fiber optic line connected to the video signal generating means. Each video signal generating means further includes a level comparator circuit for extracting the external synchronizing signal by comparing the signal level of the external synchronizing pulse signal with a reference signal having a predetermined voltage and feeds the extracted external synchronizing signal to the internal synchronizing signal generation circuit. Since the external synchronizing pulse is generated during the blanking period of the video signal, the external synchronizing signal can be transmitted commonly through the same transmission line used for transmitting the video signal without affecting the video signal.

In an embodiment, each video generating means may preferably include a circuit for removing the external synchronizing signal from the output signal fed through the corresponding information transmission lines or the fiber optic lines to the receiving means. Thereby, since the external synchronizing signal can be removed from the video signal transmitted through the information transmission lines or the fiber optic line, the external synchronizing signal does not influence the receiving means input circuits and the video signal can be flawlessly received.

In an embodiment, each video signal generating means may further include an identification code signal generation circuit for removing the external synchronizing signal from the output signal fed through the corresponding information transmission lines or the fiber optic lines to the receiving means. Thereby, since the external synchronizing signal can be removed from the video signal transmitted through the information transmission lines or the fiber optic, line, the external synchronizing signal does not influence the receiving means input circuits and the video signal can be flawlessly received.

In an embodiment, each video signal generating means may further include an identification code signal generation circuit for generating an identification code signal corresponding to an identification number, respectively allotted to each video signal generating means, for injecting the identification code signal into a video signal fed to the receiving means.

The receiving means further includes an identification code signal processing means for extracting the identification code signal from the received signal. The identification code signal processing means preferably includes a memory for storing identification data for each allotted code number, an extraction circuit for extracting the identification code signal from the received signal and generating a decoded signal by decoding the extracted identification code signal, and a controller for retrieving the identification data of the decoded signal from the memory for superimposing the retrieved identification data onto the video signal. Thereby, the received video signal can be identified by the identification code signal processing means for verification of the video generating means which is transmitting the video signal, thereby providing the basis for error free controlling of the video generating means.

The apparatus of the present invention may further comprise a control means for generating and feeding a control signal combining coded control commands with the identification code signal, decoded and fed by the extraction circuit, for controlling the video signal generating means. The coded control command is fed to the video signal generating means for operating the video signal generating means only when the identification code signal, combined into the control signal, corresponds to the identification number allotted to the video signal generating means being controlled. Thereby, only a specific video signal generating means, having its identification code extracted and decoded by the control means during the controlling process, can have its allotted identification number coincide with the identification code extracted from the control signal fed from the control means. Therefore, any specific video signal generating means can be verifiable and accurately controlled.

The control signal is injected into the information transmission line for the fiber optic line connecting the video signal generating means with the receiving means during the vertical blanking period of the video signal, and the video signal generating means may further include a control signal processing means for extracting the control signal from the information transmission line or the fiber optic line and for feeding the extracted control signal only when the identification code signal, which is combined into the control signal, corresponds to the identification code allotted to it. Since the control signals are transmitted during the blanking period of the video signal they can be transmitted to the video signal generating means from the receiving means through a common transmission line without disturbing the video signal.

Each video signal generating means preferably further includes a signal mixing means for generating a mixed signal composed of a video signal and an audio signal by injecting the audio signal into the video signal and feeding the mixed signal to a corresponding information transmission line or fiber optic line. Thereby, both the mixed video signal and the audio signal can be transmitted between the video generating means and the receiving means through a common information transmission line or fiber optic line.

The receiving means may further include an audio signal retrieving means for outputting an audio signal by retrieving the audio from the mixed signal.

The receiving means may further include a control signal driver for feeding the control signal to any of information transmission lines or fiber optic lines in the reverse direction to the propagation direction of the video signal. Each video generating means preferably further includes a control signal extractor for extracting the control signal from the information transmission line or fiber optic line and for feeding the extracted control signal to a driver circuit of the video generating means for operating peripherals such as remote positioning devices for the camera or its lens.

BRIEF DESCRIPTION OF THE DRAWINGS

The foregoing objects and features of the present invention will become apparent from the following description of the preferred embodiments of the invention with reference to the accompanying drawings, in which:

FIGS. 1A–1E show block diagrams of an apparatus for connecting fiber optic lines of the preferred embodiments of the present invention;

FIGS. 5A–5E show waveforms of an identification code signal and it clipping circuits;

DETAILED DESCRIPTION OF PREFERRED EMBODIMENTS

Figures 2A, 2B, 2C:
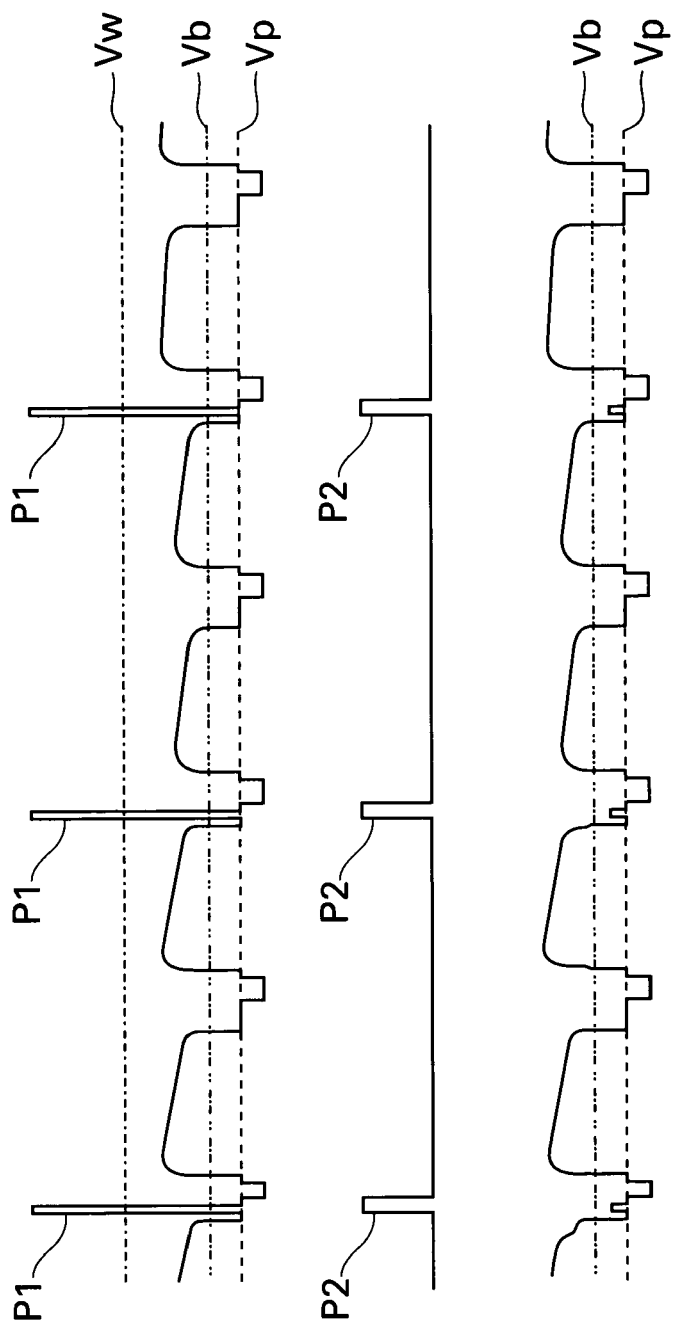
FIGS. 2A–2C show waveforms of a signal transmitted by the apparatus of FIGS. 1A–1E.

FIG. 1A shows an apparatus for connecting fiber optic lines in an information transmission system 1 as a preferred embodiment when applying the present invention to a closed circuit television system such as a monitoring system. An information signal in a close circuit television system includes a video signal and in the following description the video signal may be a composite video signal or a digital video signal or multiplexed video and audio signals, or multiplexed video and data signals, or multiplexed video, audio and data signals.

Referring to FIG. 1A, the information transmission system 1 comprises a television camera 10 for transmitting video signals through a transmission line 16T to a fiber transmitter 6 for outputting through a fiber optic cable 15 the video signal to a receiver-controller 11. The receiver-controller 11 receives the video signals and generates external synchronizing signals and/or control signals to externally synchronize and/or control the television camera 10 and feeds the signals through the fiber optic cable 15 to the fiber transmitter 6, for injecting the external synchronizing signals and/or the control signals into the transmission line 16T for externally synchronizing and/or controlling the television camera 10.

As shown in FIG. 1A the two connectors, are provided in 17 is connected to the fiber optic cable 15 and 18 which connected the transmission line 16T are common connectors for the two way signals propagated via the fiber optic cable 15 and via the transmission line 16T. Similarly, shown in FIG. 1B the two connectors, 27 which connects the fiber optic cable 15 and 28 which connects the transmission line 16R, are common connectors for the two way signals; the video signals fed to the receiver-controller 9 in one direction and external synchronizing and/or control signals to the television camera in the opposite direction.

Referring to FIG. 1B the information transmission system comprises a television camera 12 for transmitting video signals through a fiber optic cable 15 to a fiber receiver 8 for outputting through a transmission line 16R the video signal to a receiver-controller 9. The receiver-controller 9 receives the video signals and generates external synchronizing signals and/or control signals to externally synchronize and/or control the television camera 12 and feeds the signals through the transmission line 16R to the fiber receiver 8, for injecting the external synchronizing signals and/or the control signals into the fiber optic cable 15 for feeding the external synchronizing signals and/or the control signals to the television camera 12.

The receiver-controller 11 of FIG. 1A connects directly to fiber optic cable 15 through its fiber optic connector 27, while the television camera 12 of FIG. 1B connects to fiber optic 15 through its fiber optic connector 17. The receiver-controller 11 comprises a built-in fiber optic receiver; similarly the television camera 12 comprises a built-in fiber transmitter; therefore no separate fiber optic receiver is needed for the information transmission system 1 of FIG. 1A and no separate fiber transmitter is needed for the information transmission system 2 of FIG. 2B.

FIG. 1C shows an information transmission system 3 as another preferred embodiment wherein both the fiber receiver 8 and the fiber transmitter 6 which are interconnected by fiber optic cable 15 are introduced between two sections of a transmission line 16R and 16T. Therefore, both the television camera 10 and the receiver-controller 9 employ transmission line connectors 16, such as a well known coaxial cable connectors or terminals used for connecting twisted pair transmission line.

FIG. 1D shows an information transmission system 4 wherein both the television camera 12 and the receiver controller 11 comprise a fiber transmitter and a fiber receiver, respectively, and are therefore directly connected by a fiber optic cable 15 for the two way signal propagation, the camera through its fiber optic connector 17 and the receiver controller through its fiber optic connector 18.

FIG. 1E shows an information transmission system 5 as another preferred embodiment of the present invention, in which a plurality of television cameras 10 and 12 are connected to a receiver-controller and selector 90 via a plurality of transmission lines 16R or fiber optic cables 15. Each of the transmission lines or fiber optic lines connecting the multiple cameras 10 and 12 to the receiver-controller and selector 90 propagates the two way signals exactly the same way as the information transmission systems 1, 2, 3 or 4 of FIGS. 1A–1D propagate the two way signals.

Figure 3:
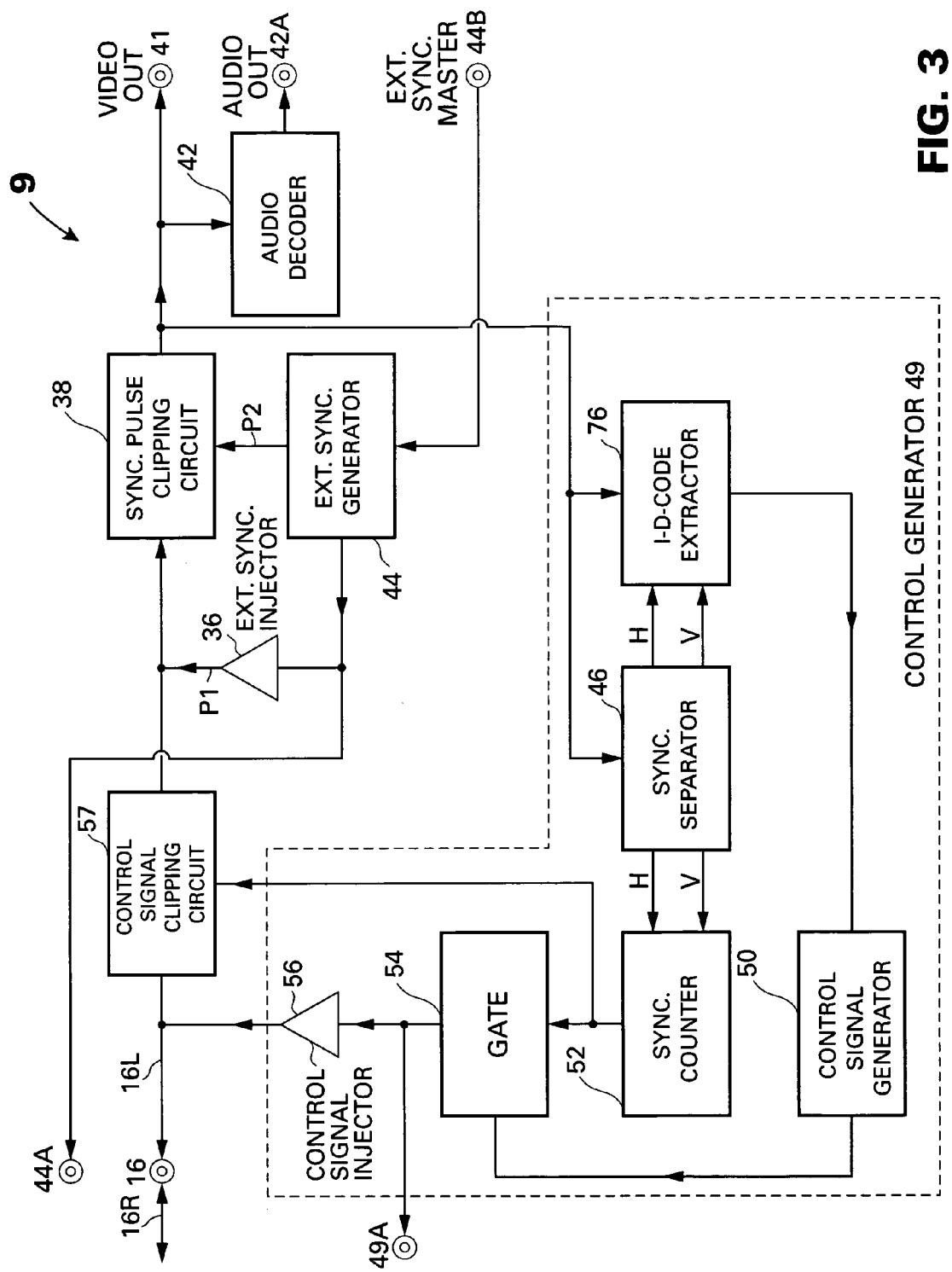
FIG. 3 is a block diagram of an electric circuit showing a receiving apparatus of the preferred embodiment of the apparatus shown in FIG. 1.

FIG. 3 shows a receiver-controller 9 incorporating a known external synchronizing generator 44 that feeds external synchronizing pulses P1 to a buffer circuit 36 for injecting the synchronizing pulses P1 to the video line 16L and to the connector 16.

The frequency of the external synchronizing signal P1 is related to the vertical frequency of the video signal generated by the television camera 10 or 12, preferably having frame or field scanning frequency. For instance, in the case of an NTSC system, the frame frequency is 30 Hz, and the field frequency is 60 Hz. In such case, the frequency of the external synchronizing pulse P1 is either frame frequency of 30 Hz or a field frequency of 60 Hz.

As shown in FIG. 2(A), the time the external synchronizing signal P1 is generated adjoining the vertical synchronizing pulse, occurs during the vertical blanking period of the video signal transmitted from the television camera 10 or 12. Thereby, the external synchronizing signal P1 can be propagated to the television camera 10 or 12 through the common transmission line 16R which carries the video signal without affecting the video signal. The voltage level of the external synchronizing signal P1 is preferably made higher than the white level Vw of the video signal. However, the voltage level of the external synchronizing signal P1 may be lower than the minimum level of the video signal.

In the following description, a frame external synchronizing pulse having a voltage level higher than the white level of the video signal, in particular, a frame external synchronizing pulse corresponding to the phase of a second field is used as the external synchronizing signal P1.

In the illustrated embodiment, each television camera 10 or 12 is a television camera operated in synchronization with the external synchronizing signal P1. For such a television camera, a well known television camera may be used synchronized with an external synchronizing signal having a voltage level higher than the level, (or lower than the level) of the video signal, as disclosed in the aforementioned U.S. Pat. No. 4,603,352.

Each of the television cameras 10 or 12 is allotted an identification number for generating respectively an identification code made of numbers of characters such as 1, 2, 3 . . . n, for injecting the identification code into the video signal during the vertical blanking period.

Each of the television cameras 10 or 12 includes a circuit for generating code signals corresponding to the identification code, and a circuit for generating a composite signal wherein the code signals are injected into the video signal. Such an apparatus is disclosed in U.S. Pat. No. 4,943,864, the entire contents of which are incorporated herein by reference; therefore, each of the information signals received by the receiver controller 9, 11 or 90 may incorporate an identification code.

As also shown in FIG. 3, the external synchronizing generator 44 of the receiver 9 feeds a pulse signal P2 shown in FIG. 2(B) synchronized with the external synchronizing signal P1 fed from same external synchronizing signal generator 44. While the buffer 36 for injecting the external synchronizing signal receives and injects the pulse signal P1 into the video signal transmission line 16L, the pulse P2 is fed to a synchronizing pulse clipping circuit 38 for clipping synchronizing pulse P1 from a signal fed from the video signal transmission line 16L which passes through the synchronizing pulse clipping circuit 38, and a video signal containing no synchronizing pulse P1 is fed to the output connector 41.

The synchronizing pulse clipping circuit 38 is fed with the signal shown in FIG. 2(A) from the video signal transmission line 16L and the timing signal P2 shown in FIG. 2(B) from the external synchronizing generator 44. The signal P2 activates the clipping circuit for the duration of P2, thereby the clipping circuit 38 clips the entire signal portion of the signal fed to its input terminal above the black level Vb of the video signal during the period of signal P2. Since the duration of P2 covers the period of the external synchronizing pulse P1 the external synchronizing signal P1 is removed by the clipping circuit 38 from the composite video signal fed to the output connector 41 as shown in FIG. 2(C).

Accordingly, even though the external synchronizing signal P1 is present in the video signal fed from the television camera 10 or 12 through the transmission line 16L it is removed by the clipping circuit 38; therefore, the external synchronizing signal P1 injected into the video signal transmission line 16L will synchronize the television camera 10 or 12 and will not cause any receiving error by display apparatuses connected to output connector 41.

When the television camera 10 or 12 generates an audio signal, the signal is multiplexed with the video signal inside the television camera 10 or 12 and the multiplexed signal is fed to the fiber transmitter 6 through the transmission line 16T; the fiber transmitter 6 feeds the multiplexed video signal through the fiber optic cable 15 to a fiber receiver 8 which feeds the multiplexed signal to a receiver-controller 9, 11 or 90 through transmission line 16R. The mixed video signal and the audio signal are then fed from the output signal of the clipping circuit 38 to the audio decoder 42 which outputs decodes audio signals through the audio output connector or terminal 42A.

The receiver-controller 9 also includes a control generator 49 for generating a control signal for controlling the corresponding television camera 10 or 12. The control generator 49 includes a synchronizing separator circuit 46 for separating the horizontal and vertical synchronizing signals H and V from the video signal propagated through the video line 16L. Also included is a control signal generator circuit 50 for outputting a control signal for operating the corresponding television camera 10 or 12 during a predetermined timing on the basis of the separated synchronizing signals H and V. A counter 52 is provided for counting the number of horizontal scanning lines fed from the sync separator 46 during each frame or field. The control signal generator 49 also includes a gate circuit 54 for generating a gate signal when the counted value of the counter 52 is a predetermined value, and a buffer 56 controlled by the gate signal for injecting the control signal fed from the control signal generator circuit 50 into the video line 16L.

In the preferred embodiment of the present invention, the injector circuit may include a mixer circuit wherein the code signals are mixed and injected into the composite video signal. Such a mixer circuit is disclosed in U.S. Pat. No. 4,989,085, the entire contents of which are incorporated herein by reference, or it can be an injection circuit disclosed in U.S. Pat. No. 5,335,014 the entire contents of which are incorporated herein by reference.

The control command fed through the video line 16L for propagating a control command code to the cameras 10 or 12 may include a control code for switching a power supply on-off, wiper on-off, tilting up-down, panning left-right and zooming tele-wide or the like, or a start or stop command of the transmission of a video signal. The control signal may combine the control code corresponding to the control command and the identification code respectively allotted to each of the television cameras 10 or 12. In addition, the control signal is injected into the video line 16L by the buffer circuit 56 of FIG. 3 at a predetermined time within the vertical blanking period. The injection timing of the control signal into the video line 16L is different from the injection timing of the external synchronizing signal into the video line 16L.

It is apparent from the above description that both the external synchronizing signal and the control signal can be transmitted from the receiver 9 to the television camera through the transmission line 16R.

Figure 4:
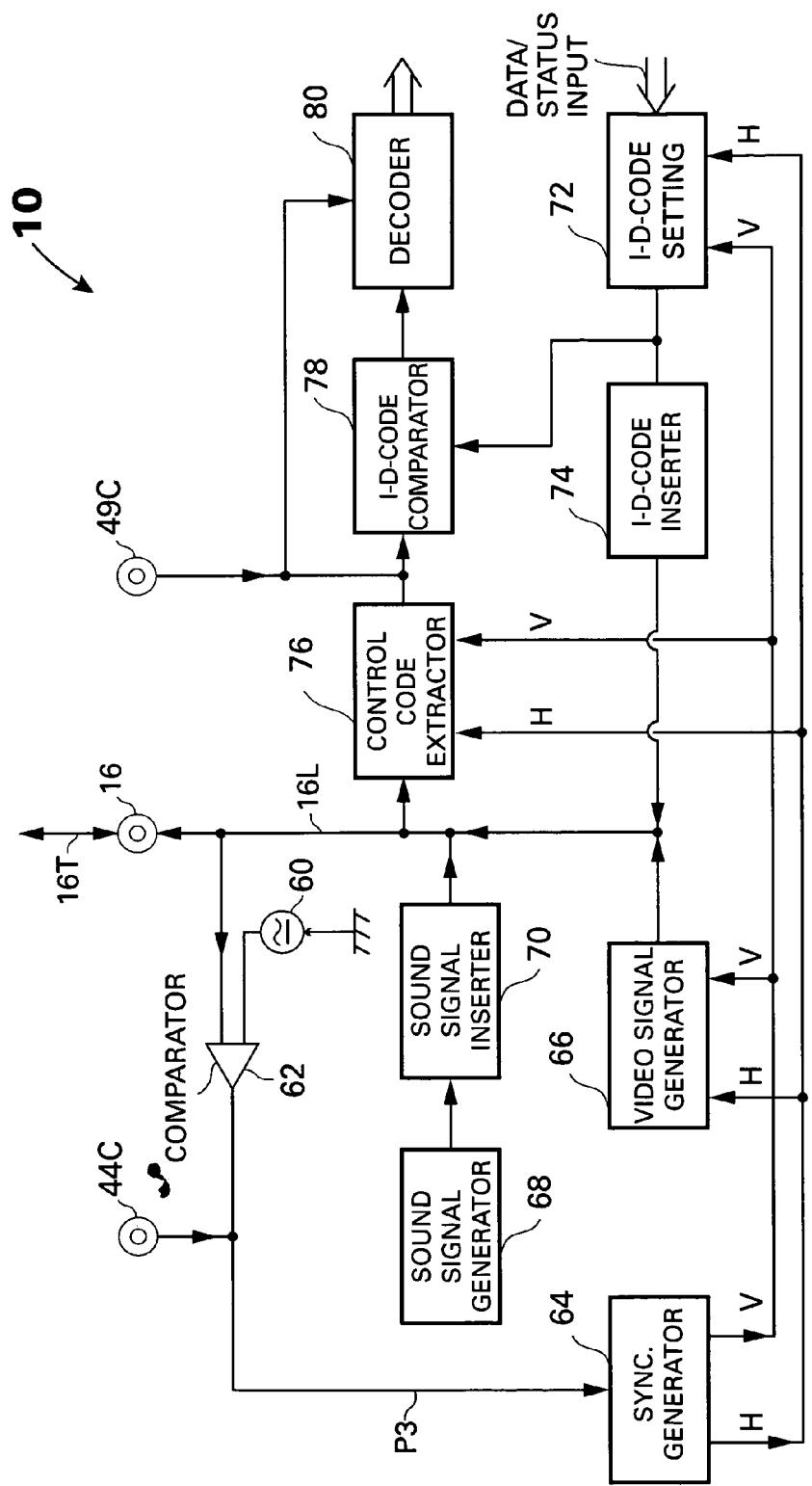
FIG. 4 is a block diagram of an electric circuit showing a television camera of a preferred embodiment of the apparatus shown in FIG. 1.

As shown in FIG. 4, each television camera 1 includes a reference source 60 which feeds a reference signal or voltage to the voltage comparator 62 for separating the external sync pulse by comparing the voltage level of the external synchronizing signal P1 transmitted from the transmitting apparatus through the transmission line 16T with the reference signal or voltage and generating a pulse signal P3 when P1 level is same or larger than the reference signal or voltage. An internal synchronizing signal generation circuit 64 generates internal synchronizing signals H and V synchronized with the pulse signal P3 fed from the voltage comparator 62; a video signal generation circuit 66 generates a video signal synchronized with the internal synchronizing signals H and V for feeding the synchronized video signal to the transmission line 16T; an audio signal generation circuit 68 generates an audio signal along with the video signal and an audio signal injection circuit 70 injects the audio signal into the video line 16L for mixing the audio signal into the video signal.

As also shown in FIG. 4, each television camera 10 may include an identification code setting circuit 72 for generating an identification code respectively allotted to the television camera 10 at a predetermined time within the vertical blanking period of the composites video signal on the basis of the internal synchronizing signals H and V and an identification code injection circuit 74 for injecting the identification code fed from the setting circuit 72 into the video line 16L.

The timing the identification code is injected into the transmission line 16T by the injection circuit 74 is different from the timing the control signal is injected into the transmission line 16R by the receiver-controller 9 shown in FIG. 3. The control signal is injected into the transmission line 16R by the receiver controller 9 during one or more predetermined horizontal scanning lines during the vertical blanking period of the composite video signal, while the identification code is injected into the transmission line 16T by the television camera 10 during one or more predetermined different horizontal scanning lines during same or another vertical blanking period of the composite video signal.

Identification code signals are shown in FIGS. 5A–5C. The identification code signal is a binary code or a bar code signal having two or more levels composed of a high level or white, which is the maximum or highest level of the picture signal in the video signals, a low level or black, which is the lowest level of the picture signal, and a median level or gray, which is the medium level of a picture signal in the video signal generated by the television cameras 10 as shown in FIG. 5A; the identification code may be a combination of pulse signal levels and varying pulse widths as shown in FIG. 5B.

Alternatively, the identification code signal may be either a sine-wave signal or a pulse signal having a frequency corresponding to the identification code, the sine-wave, or the pulse signal is generated during one or more horizontal scanning periods as shown in FIG. 6C, preferably, during the vertical blanking period.

The control signal generator 50 shown in FIG. 3 generates the control code signals in electronic shaped signals similar to the identification code signal shown in FIG. 5 (A–C). However, different shaped electrical signals may be applied to the control code signal and the identification code signal, similarly, the identification code incorporated in the control signal does not have to be identical to the identification code generated by the identification setting circuit 72 of the television camera shown in FIG. 4. Any code commensurating with the allotted identification to each television camera can be used instead of an identical identification code.

The control signal generator 50 shown in FIG. 3 may generate well known telephone dial tones or it may consist of an audio compression circuit for compressing real time audio of one or more field durations into one or more horizontal periods.

The television camera 10 of FIG. 4 may further include a control code extraction circuit 76 for extracting a control code and an identification code generated by the control signal generator circuit 50 shown in FIG. 3, an identification code comparing circuit 78 for comparing the extracted identification code with an identification code fed from the setting circuit 72 for feeding a match signal to a decoder 80 when both codes correspond to each other, and decoder 80 for decoding the control code fed from the control code extraction circuit 76 and generating control commands corresponding to the decoded control code only when the decoder 80 is fed with the match signal from the identification code comparator 78.

Figure 6B:
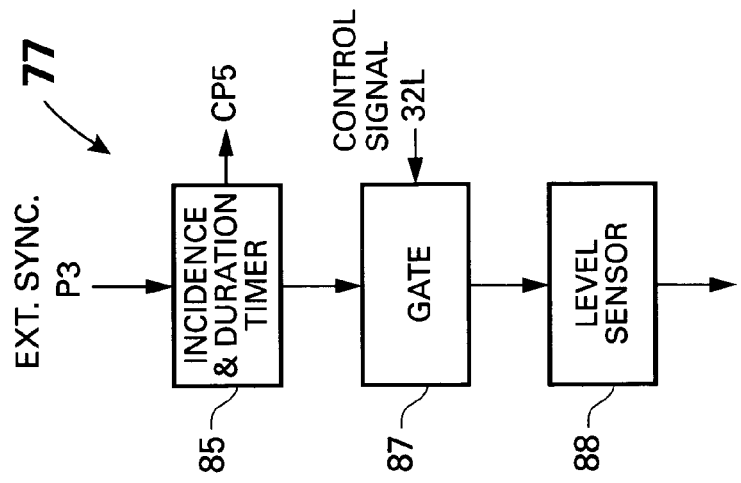
FIG. 6B is a block diagram of a code extraction circuit of the television camera shown in FIG. 4A and of the preferred embodiment of a fiber transmitter shown in FIG. 7.
Figure 6A:
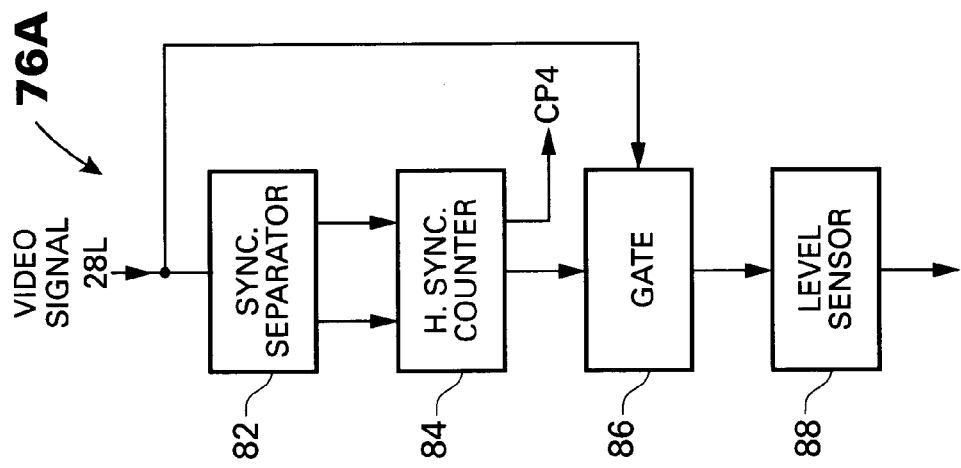
FIG. 6A is a block diagram of a code extraction circuit of a preferred embodiment of the fiber receiver shown in FIG. 8.
Figure 6:
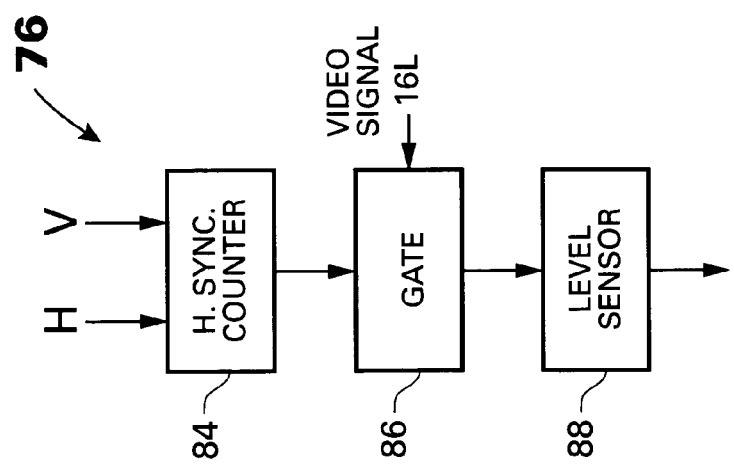
FIG. 6 is a block diagram of a code extraction circuit of the receiving apparatus shown in FIG. 3 and of the television camera shown in FIG. 4.

The code extraction circuit 76 shown in detail in FIG. 6 incorporates a counter 84 for counting the number of horizontal synchronizing pulses during every field or frame of the video signal, a gate circuit 86 connected to the output of the counter 84 for outputting the video signal fed from video line 16L when the counted value of the counter 84 is a predetermined value, a level sensor 80 for sensing a signal level or for detecting the envelope of the signal fed from the gate circuit 88 to reproduce and output the code signal extracted from the video signal fed from the transmission line 16T.

The code comparing circuit 78 generates a match signal when the extracted code fed from the extraction circuit 76 corresponds to or commensurate with the code set in the setting circuit 72, and generates a mismatch signal when the extracted code fed from the extraction circuit 76 does not correspond or commensurate with the code set in the setting circuit 72.

When using a control code and an identification code having a signal waveform shown in FIG. 5C the level sensor circuit 88 of FIGS. 6A–6C may incorporate a frequency or pulse counter for counting the frequency or the number of pulses, fed from the gate circuit 86. If the generated control signal is a dial tone signal or a compressed audio signal the level sensor circuit 88 may further include a well known dial tone decoder or a well known audio decompression circuit.

The decoder 80 of FIG. 4 feeds the different control commands to different drivers (not shown) for operating the television camera 10 by commanding the power supply on-off, wiper on-off, tilting up-down, panning left-right, zooming tele-wide, focus near-far, iris open-close or the like, or commanding the start of the stop of the transmission of a video signal.

The code setting circuit 72 can be fed with data from switches and sensors which form part of a peripheral status data such as pan-tilt head positioning, for generating codes pertaining to the executions of a control commands, or for generating diagnostic codes pertaining to the actual state of any peripheral or to any of the cameras internal circuits operational status. The codes for confirming control command execution, status, or diagnostic codes are injected into the video line 16L through the code inserter 74 at a predetermined horizontal line or lines within the vertical blanking period.

The timing of injection of the control commands execution codes, status and diagnostic codes into the video line 16L is different from the timing of the identification code injection and different from the injection timing of the external synchronizing signal or the control signals generated by the receiver-controller 9 of FIG. 4. For example, the synchronizing signal is injected at the beginning of the first horizontal line of the vertical blanking period; the identification code is injected during the horizontal line twelve of the vertical blanking period, while the control signal is injected during the horizontal lines fourteen and fifteen and the estatus-diagnostic code during the horizontal line seventeen, all within the vertical blanking period.

It has been apparent from the above description that a multiplex signal composed of the video and audio signals, along with status and/or diagnostic code signals and the identification code respectively allotted to each television camera 10 or 12 can be transmitted from the television camera 10 toward the receiver-controller 9 through the video signal transmission line 16T.

Figure 7:
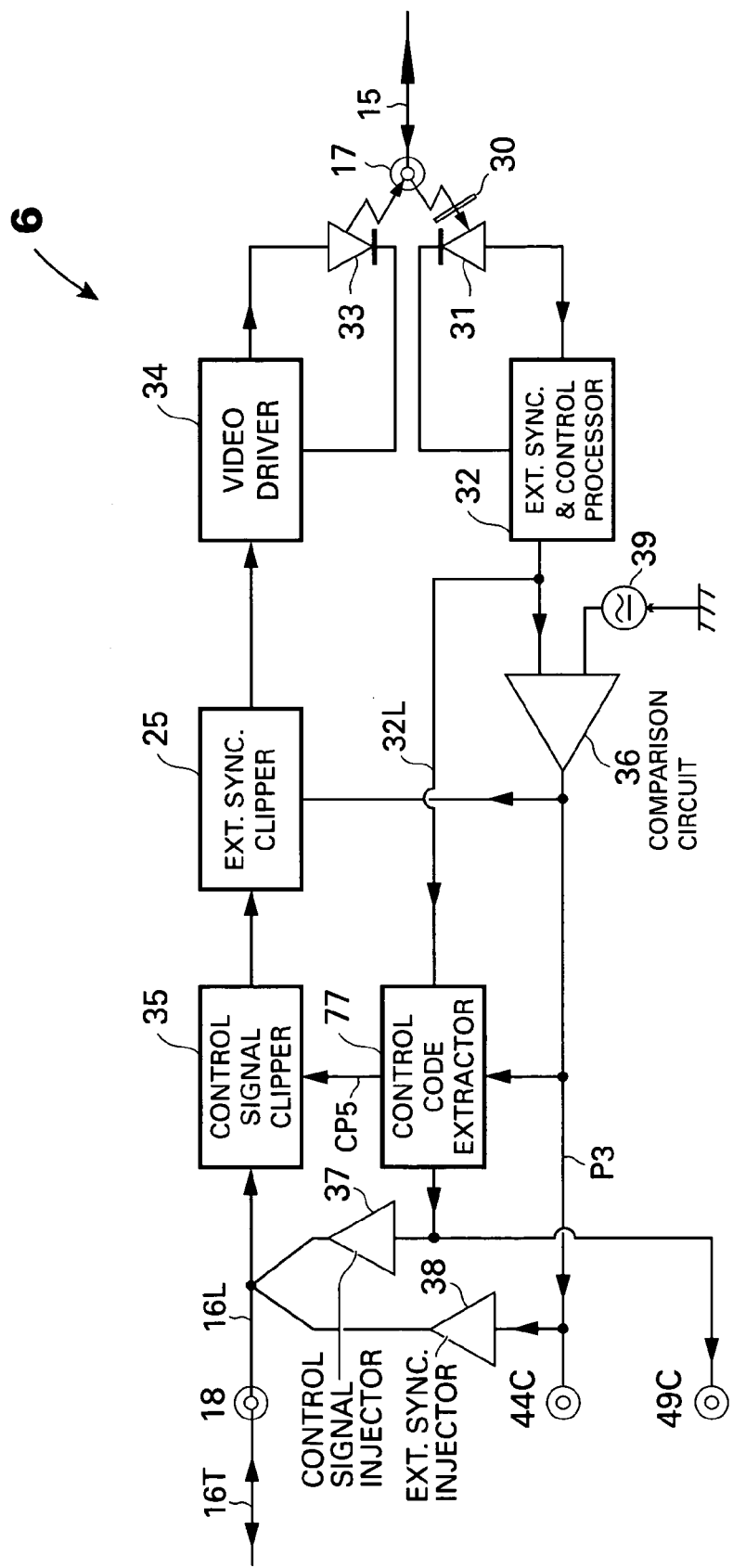
FIG. 7 is a block diagram of the fiber transmitter for connecting the fiber optic cable to an information transmission line of a preferred embodiment of the present invention.

As shown in FIG. 7 the fiber optic transmitter 6 comprises a well known light emitting diode or a laser 33, a photo transistor or pin diode 31 and a filter 30 optically connected to the fiber optic connector 17 that employs well known photo splitting device such as a prism, or a fiber optic cable splitter directing the optical path to the light emitting diode 33 and to the pin diode 31, thereby providing well known two way optical signal propagation through the fiber optic connector 17. The light emitting diode 33 generates a light signal having a wave length different from the receiving wave length of the pin diode; for example the light emitting diode may generate a light signal having a wave length of 1300 nm or 1550 nm and the pin diode receiving wave length may be 850 nm.

The filter 30 is an optical filter having an optical pass wave length commensurate with the wave length of the pin diode 31, thereby ensuring that only control and external synchronizing signals being propagated from the receiver-controller 9, 11 or 90 reach the pin diode 31 and that no stray or return video signals will interfere with the external synchronizing or the control signals.

Alternatively, it is possible to employ two uni-directional fiber optic cables through two separate fiber optic connectors 17, wherein one connector 17 directly receives the optical signal from the light emitting diode 33 and the other fiber optic connector 17 feeds the optical signal directly to the pin diode 31. In such an arrangement the optical splitting device and the filter 30 are unnecessary and both signal's wavelength can be identical.

The video signal fed through the transmission line 16Y via connector 18 passes through a control signal clipper 35 and through the external synchronizing signal clipper 25 to a video driver 34 that feeds video drive signals to the light emitting diode 33.

The video driver 34 is a well known fiber optic video driver, processing analog video drive signals or converting the video signals into amplitude modulated (AM) or frequency modulated (FM) video drive signal to drive the light emitting diode 33. However, as the level of the external synchronizing signal combined with the video signal and propagated through the transmission lines 16R and 16T is higher than the level of the video signals, the inclusion of the external synchronizing signal at the input of the video driver 34 will cause an analog signal driving error, or it may cause a frequency modulation error if the video driver 34 employs a frequency modulator, thereby over drive or distort the optical signal. Therefore it is preferable to remove the external synchronizing signal from the video signals fed to the video driver 34. As will be explained later it is also preferable to remove the external synchronizing signals to prevent a closed signal loop.

Figure 8:
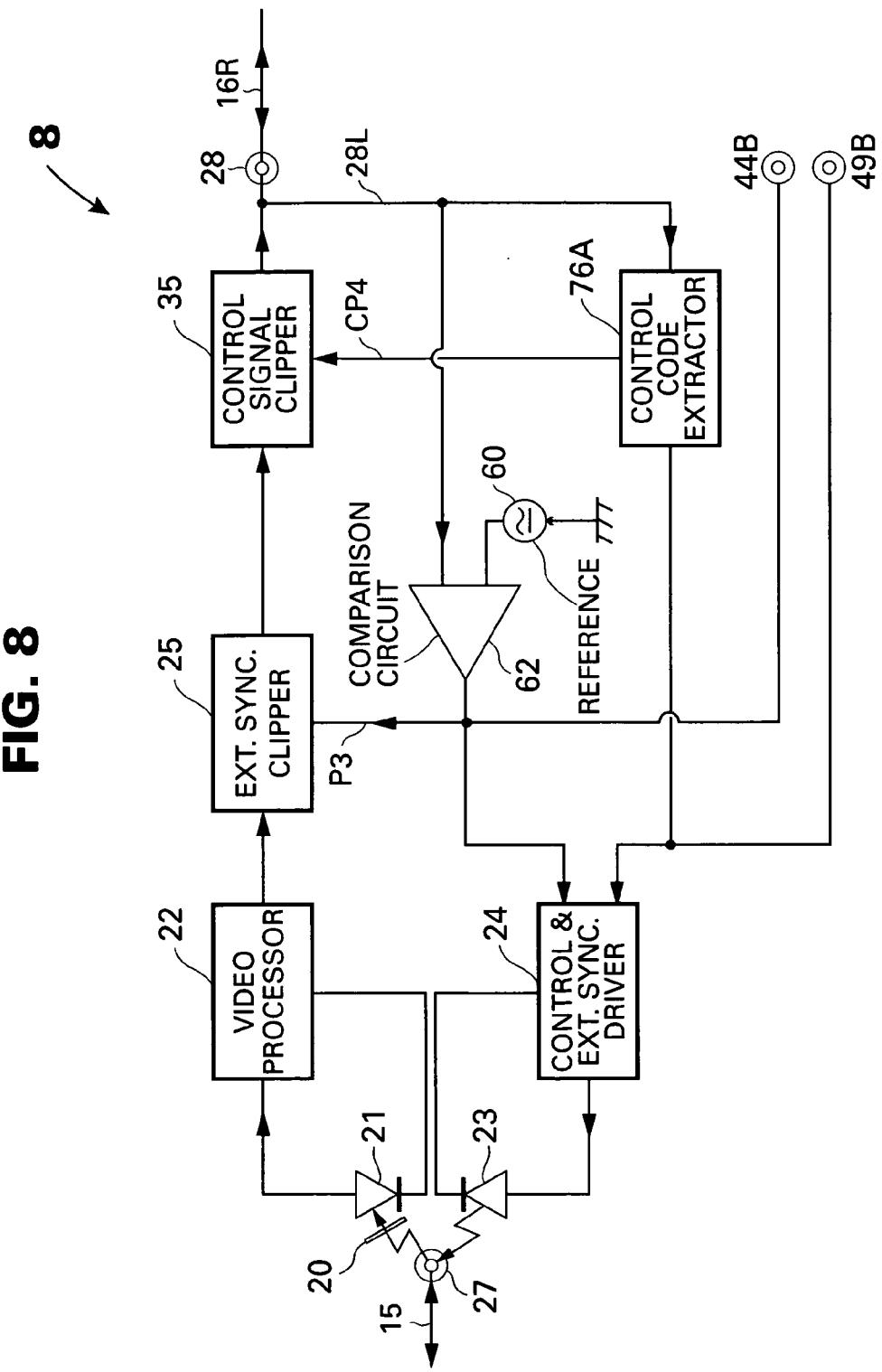
FIG. 8 is a block diagram of the fiber receiver for connecting the fiber optic cable to an information transmission line of a preferred embodiment of the present invention.

Shown in FIG. 8 is a fiber optic receiver 8 comprising of a well known light emitting diode or laser 23, a photo transistor or pin diode 21 and a filter 20 optically connected to the fiber optic connector 15 that employs a well known photo splitting device such as a prism or a fiber optic cable splitter, directing the optical path to the light emitting diode 23? and to the pin diode 21, thereby providing well known two way optical signal propagation through the fiber optic connector 15. The light emitting diode 23 generates a light signal having a wave length different from the receiving wave length of the pin diode; for example the light emitting diode may generate light signal having a wave length of 850 nm and the pin diode receiving wave length may be 1300 nm or 1550 nm.

The filter 20 is an optical filter having an optical pass wave length commensurate with the wave length of the pin diode 21, thereby ensuring that only video signals being propagated from the television camera 10 or 12 reach the pin diode 21 and that no stray or return of external synchronizing and/or control signals will interfere with the video signals.

Alternatively as explained above, it is possible to employ two uni-directional fiber optic cables through two separate fiber optic connectors 15, wherein one connector 15 feeds the optical signal directly to pin diode 21 and the other fiber optic connector 15 receives the optical signal directly from the light emitting diode 23. In such an arrangement the optical splitting device and the filter 20 are unnecessary and both signal's wavelength can be identical.

Since the detailed description of the preferred embodiment details two way optical signal propagation over a single fiber optic cable and as the wavelength of the two way signals must be reciprocal in the fiber transmitter and the fiber receiver, in the following description a wave length of 1300 nm is used for the external synchronizing and/or control signals.

Therefore, in the following description the light emitting diode 33, the filter 20 and the pin diode 21 are all having an optical signal wave length of 1300 nm and the light emitting diode 23, filter 30 and pin diode 31 are all having optical signal wave length of 850 nm.

The control and external synchronizing signal driver 24 of FIG. 8 is a well known fiber optic signal driver, which processes pulse or analog drive signals or converts the signals into amplitude modulated (AM) or frequency modulated (FM) drive signals for driving the light emitting diode 23.

As the fiber transmitter 6 and fiber receiver 8 are connected via the fiber optic cable 15 and as the wave length of the optical signal generated by the light emitting diode 23 is 850 nm, reciprocating the transmitter 6 of FIG. 7, it is apparent that the external synchronizing and/or control signals emitted by the light emitting diode 23 will reach the pin diode 31 of FIG. 7.

Similarly, it is apparent that multiplexed video signals emitted by the light emitting diode 33, emitting the signal wave length of 1300 nm will reach the pin diode 21 of FIG. 8 through the filter 20, thereby providing well known fiber optic two way signals propagation.

The input of the comparison circuit 62 of FIG. 8 is connected to the line 28L and applied with video signals mixed with external synchronizing signals present on the transmission line 16R for separating the external synchronizing signals from the video signals by comparing the mixed signals with a predetermined reference signal or voltage 60, in a similar manner the comparator 62 of the television camera 10 is separating the external synchronizing signals.

Similarly, the control code extractor 76A will extract the control signals from the composite signals fed through line 28L. Referring to FIG. 6A the control code extractor is composed of a separator circuit 82 for separating the horizontal and the vertical synchronizing signals from the video signal, a counter 84 for counting the number of horizontal scanning lines for each field or frame, a gate circuit 86 for outputting the video signal only during a period when a counted value of the counter 84 is equal to a signal by sensing the level or the envelope of the output signal of the game circuit 86. The counter 84 also feeds a clipping pulse CP4 for activating the control signal clipper 35 of the fiber receiver 6 shown in FIG. 8.

As the timing incidence of the external synchronizing signal is different from the timing of the control signals, the feeding of the separated external synchronizing signals and the control signal to the control and external synchronizing driver 24 will not interfere with each other.

Further, the external synchronizing signal level is larger than the video signal level while the maximum level of the control signal is the white signal level of the video signal which is the highest level of the video signal as shown in FIG. 5A. Therefore the control and external synchronizing driver 24 can feed the two different levels of signals to the light emitting diode 23 for emitting two different distinct optical signals which are also separated by time incidence.

As the control signal will be re-injected at the fiber transmitter 6 into the video line it is necessary to remove the re-injected control signal from the video line 28L in order to prevent a closed signal loop and possible oscillation when feeding the received video signals incorporating re-injected control signals back to the input of the control code extractor 76A.

The game circuit 86 of the control code extractor 76A shown in FIG. 6A feeds a clipping pulse CP4 for the duration the gate circuit 86 outputs the composite signal to the level sensor 88, which is the specific predetermined horizontal period for the control signals to be injected by the receiver-controller 9 or 90. The clipping pulse CP4 shown in FIG. 5D is fed to and activates the control signal clipper 35 of FIG. 8 for the duration of CP4, thereby clipping and removing the entire control signals that are to be re-injected at the fiber transmitter 6. Shown in FIG. 5D is the clipping pulse CP4 having a duration of one horizontal scanning period, and FIG. 5E showing the clipped signal at the output of the control signal clipper 35. However, the predetermined duration of the clipping pulse CP4 can be a duration of several horizontal periods when the control signals generated by the receiver controller 9, 11 or 90 are injected into the video signal during the corresponding several horizontal periods.

As shown in FIG. 7 the fiber transmitter 6 also comprises control signal clipper 35 and external synchronizing signal clipper 25 for removing the control and the external synchronizing signals from the input of the video driver 34 and from the light emitting diode 33, thereby removing the control signals and/or external synchronizing signals from the emitted optical signals and preventing closed signal loops. Accordingly, the optical signals reaching the fiber optic receiver 8 via fiber optic cable 15 do not contain external sync or control signal components. Regardless it is preferable to introduce control signal and external synchronizing signal clipping circuits along each and every element that interfaces the fiber optic line and the transmission line, including the receiver-controller and the television camera, thereby ensuring that no residual closed signal loops or signal errors may occur in any setup of combining a fiber optic line and a transmission line.

Referring to the fiber receiver 8 of FIG. 8, the external synchronizing clipper 25 shown is similar to the external synchronizing clipping circuit 38 of the receiver-controller 9 shown in FIG. 3 and it removes any residual external synchronizing signals from the output connector 18.

The optical signal reaching the well known pin diode 21 converts the optical signals into electrical signals and feeds the electrical signals to the input of the video processor 22. The video processor 22 may employ an analog amplifiers when the optical signals fed through the fiber optic cable 15 are analog signals or amplitude modulated signals, or it may employ an FM demodulator circuit when the optical signals fed through the fiber optic cable 15 are frequency modulated (FM) signals.

The video processor 22 further compromises well known small signal transimpedance amplifiers and a well known output video amplifier to output video signals. The output video signal is fed through the external synchronizing clipper 25 and through the control signal clipper 35 to the video output connector 28.

It is apparent from the above description that the fiber receiver 8 of FIG. 8 can extract external synchronizing and control signals from the signals present at its output connector 28 and re-inject the extracted signals into the fiber optic connector 27 for propagating the external synchronizing signal and/or the control signals in the reverse direction to the propagation of the video signals without disturbing the video signals, thereby providing for the connection of a fiber optic line to a transmission line through common connectors carrying two way signals.

Similarly it is apparent from the above description that the fiber transmitter 6 of FIG. 7 can extract the external synchronizing and/or the control signals propagated by the fiber optic cable 15 through its output connector 17 and re-inject the extracted signals into the input connector 18 in reverse direction to the propagation of the video signals without disturbing the video signals, thereby providing for the connection of a fiber optic line to a transmission line through common connectors carrying two way signals.

Figure 3A:
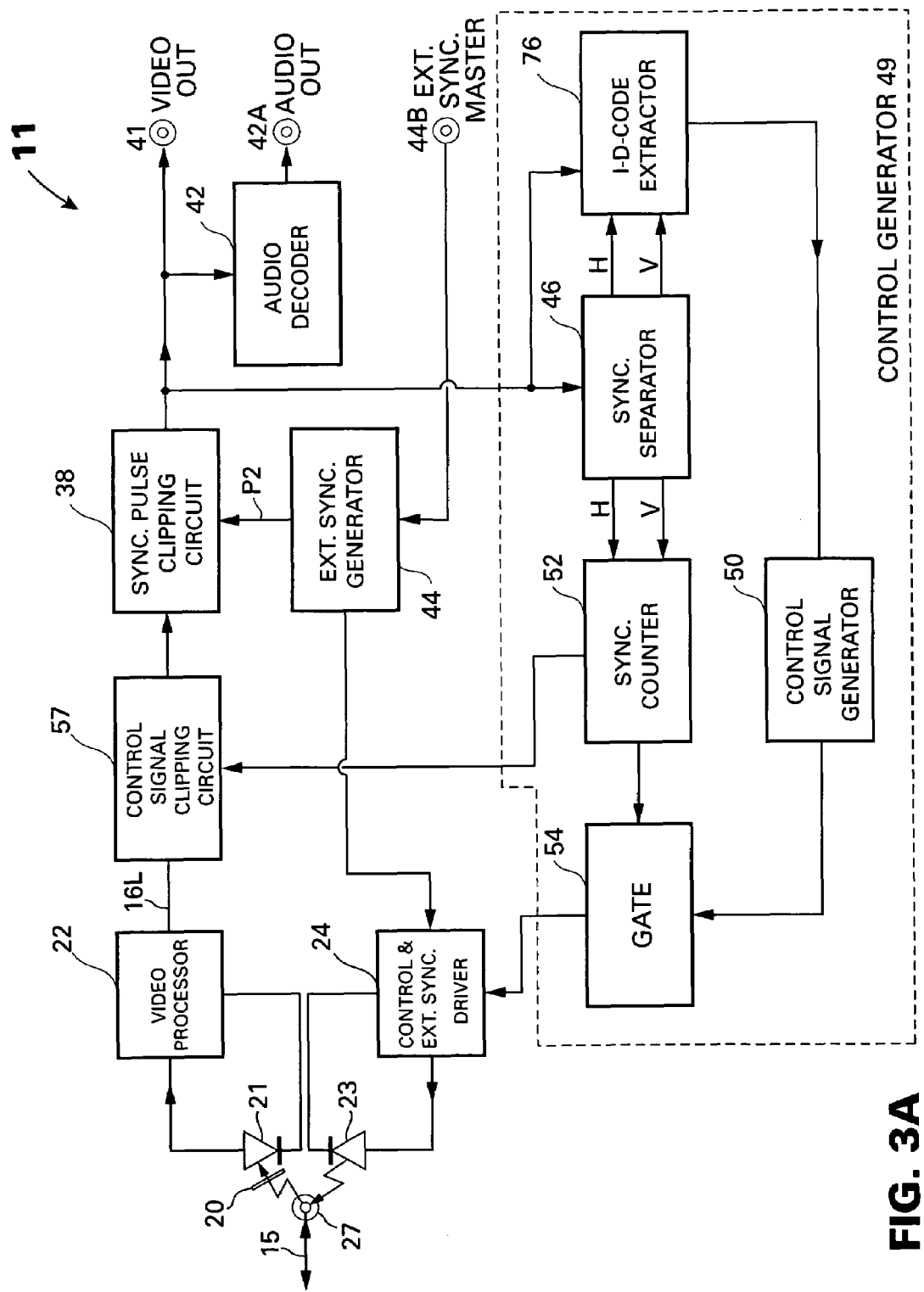
FIG. 3A is a modified block diagram of the electric circuit of FIG. 3 for providing a connector to connect fiber optic cable to a receiving apparatus of the preferred embodiment.

Shown in FIG. 3A is a receiver-controller 11 adapted to process optical video signals through its optical connector 27, filter 20 and pin diode 21 and through video processor 22, similarly to the way the fiber receiver 8 is processing the optical video signal. The external synchronizing and/or control signals are directly fed from the external synchronizing generator 44 and from the control signal gate 54 to the control and external synchronizing driver 24, making the use of fiber receiver 8 of FIG. 8 redundant. It is apparent however, that fiber transmitter 6 can be connected directly through fiber optic cable 1 to the receiver 11 and provide the means for re-injecting the external synchronizing and/or control signals into the transmission line 16T connecting the fiber transmitter 6 and the television camera 10.

Figure 9:
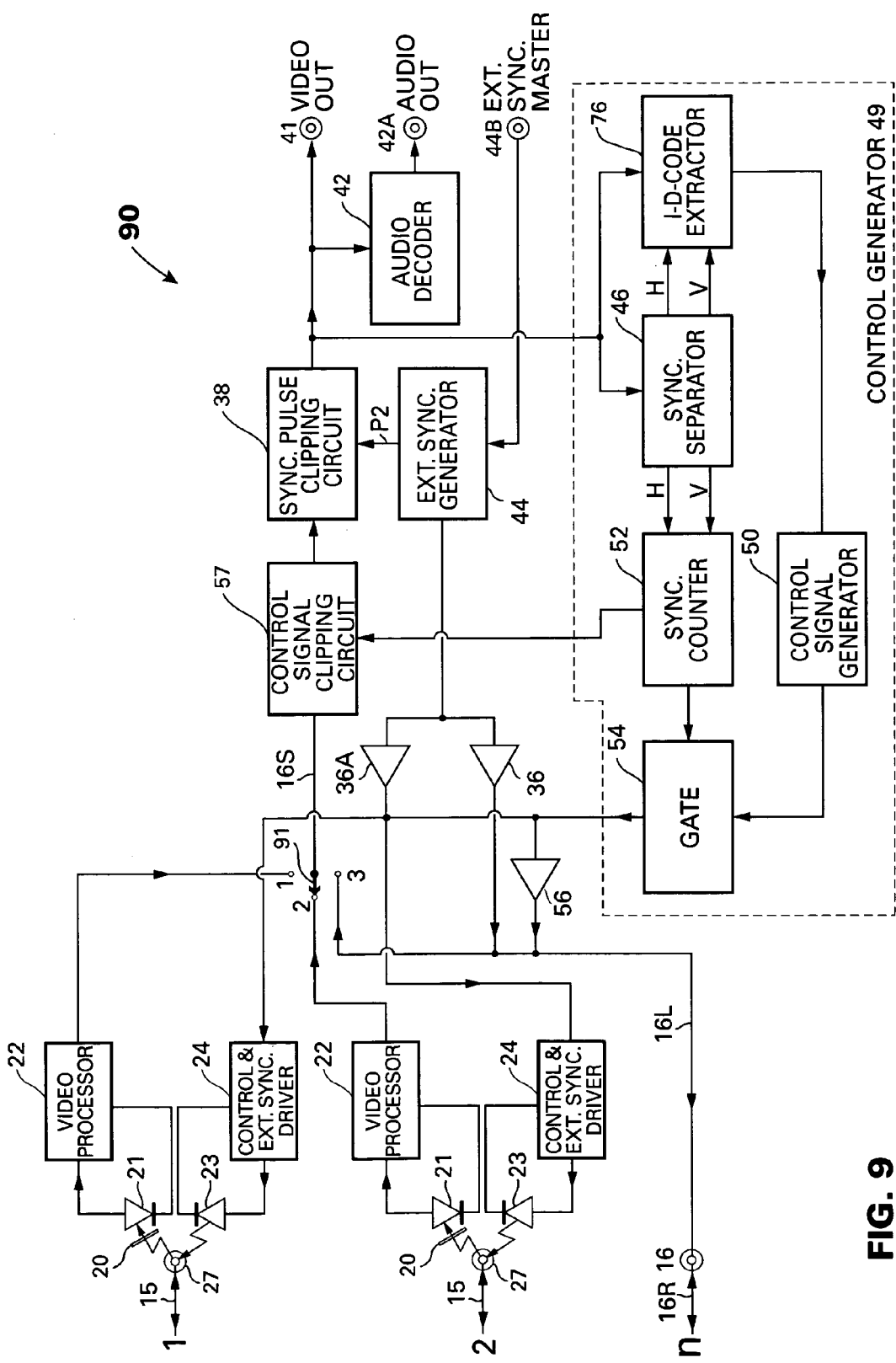
FIG. 9 is a block diagram of an electric circuit showing a receiving apparatus with a selector as another preferred embodiment of the apparatus shown in FIG. 1E.

The receiver 9 of FIG. 3, the receiver 11 of FIG. 3A and the receiver 90 of FIG. 9 include a control signal clipping circuit 57 for clipping any residual control signals from the video signal, thereby ensuring that no residual control signals due to closed signal loops will re-enter the input of the identification code extractor which otherwise may cause code extraction errors. The control signal clipping circuit 57 is activated by the output of the sync counter 52 and operates the same way as the control signal clipper 35 of FIG. 8.

Shown in FIG. 9 is a receiver 90 comprising a selector switch 91 for selectively connecting plurality of television cameras 10 or 12. When plurality of television cameras 10 or 12 are selectively connected to a receiver-controller 90 via the selector switch 91 it is preferable to have all the internal synchronizing generators 64 shown in FIGS. 4 and 4A of the plurality of the television cameras 10 or 12 externally synchronized and locked to each other, thereby preventing disturbances during or immediately after the selection or the switch-over from one television camera to another.

The external synchronizing signal generator 44 feeds such external synchronizing signals to the transmission line 16R via buffer 36 and connector 16 and to the fiber optic cables via buffer 36A, and the control and external synchronizing drivers 24, the same way as the receiver-controllers 9 and 11 shown in FIG. 3 and FIG. 3A inject external synchronizing signals into the individual transmission line or fiber optic cable, respectively.

The control signals generated by the control generator 49 of FIG. 9 are either injected into the transmission line 16L by the control signal injection or buffer 56, the same way the buffer 56 of the receiver-controller 9 shown in FIG. 3 injects the control signals, or the control signal is fed directly from the gate 54 to the control and external synchronizing signal drivers 24 in the same way as the gate 54 of the receiver-controller 11 of FIG. 3A feeds the control signals.

The switch 91 shown in FIG. 9 is a single pole rotary switch however the switch may be any type of electrical switch, such as analog IFC switch or matrix IC switch or any other electrical or mechanical switch or combination of switches. The output pole of the switch is connected through line 16S to the control signal clipping circuit 57 and through the synchronizing pulse clipping circuit 38 to output video signal with no control or external synchronizing signals residuals. If multiple transmission lines 16R are to be connected to the input poles of switch 91 of the receiver-controller 90 it is possible to connect the output of the buffer 56 to line 16S instead of to multiple n poles and thereby feed the control signals selectively through the switch 91 to the television cameras.

It is also possible to feed control signals to multiple n poles of the switch 91 in parallel via multiple buffers 56. Each of the television cameras 10 or 12 can be verifiably controlled by combining the identification of the selectively connected camera into the control code, which enables to feed control signals in parallel to all the television cameras 10 or 12 at once; yet only the television camera selected through switch 91 will have its identification extracted by the code extractor 76 and mixed into the control command via the control signal generator 50 and therefore will be the only television camera 10 or 12 responding to the control signal when the mixed code is compared with the television camera identification code by the code comparator circuit 78 of the television camera shown in FIG. 4 and FIG. 4A.

Figure 4A:
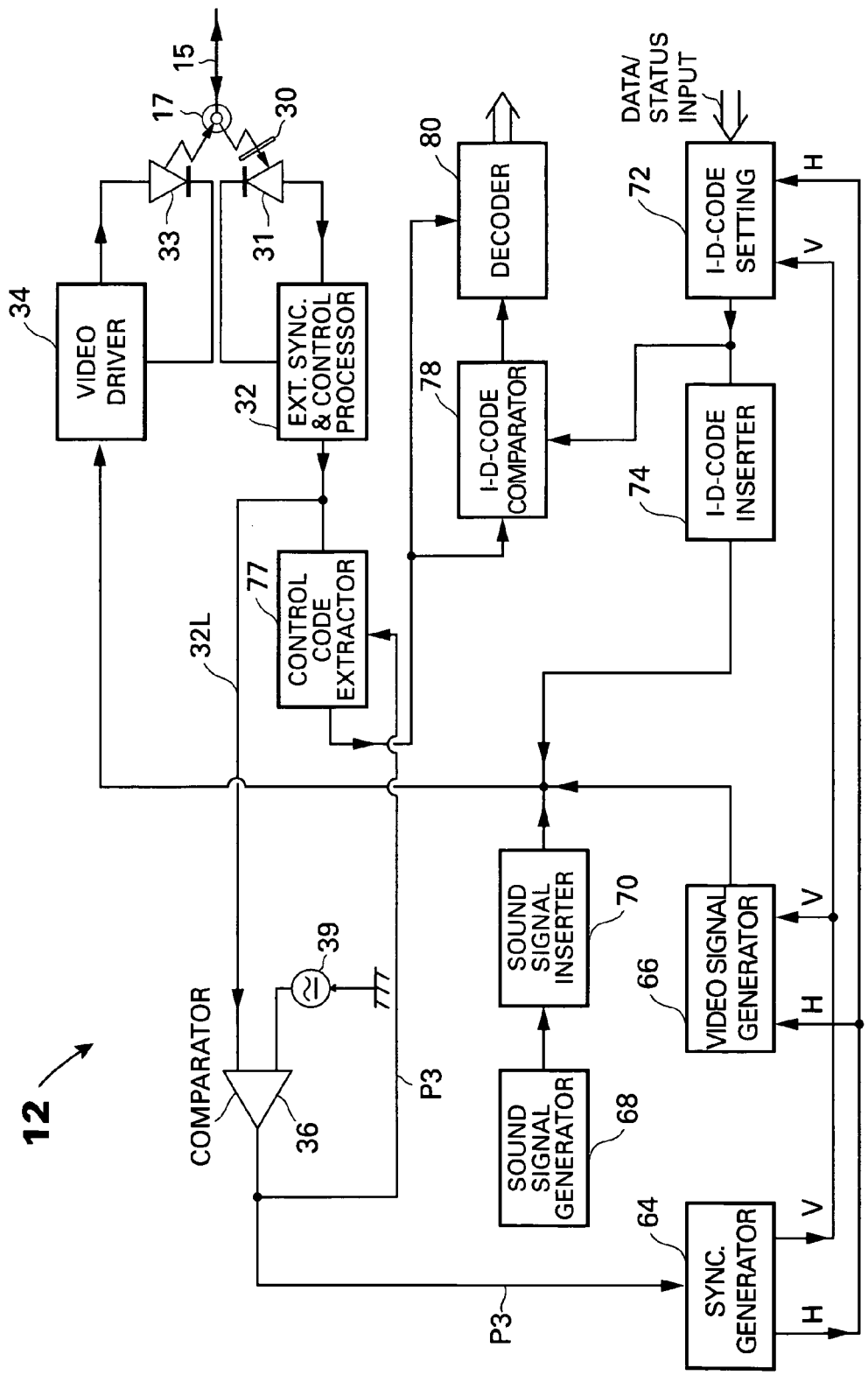
FIG. 4A is a block diagram of the modified electric-circuit of FIG. 4 for providing a connector to connect a fiber optic cable to a transmitting apparatus of the preferred embodiment.

The television camera 12 shown in FIG. 4A comprises a well known light emitting diode or a laser 33, a photo transistor or pin diode 31 and a filter 30 optically connected to the fiber optic connector 17 that employs well known photo splitting device, in a setup similar to the fiber transmitter 6. Similarly the video driver 34, the external synchronizing and control signals processor 32, the control code extractor 77, the comparator circuit 36 and the reference source 39 are all similar circuits to the circuit of the fiber transmitter 6 and are interconnected in the same way the circuits of the fiber transmitter 6 are connected.

The comparison circuit 36 feeds the control code extractor 77 of the embodiment of FIG. 4A and the embodiment of FIG. 7 with the external synchronizing pulse P3. As shown in FIG. 6B the pulse P3 is fed to the input of an incidence and duration timer 85, which generates a predetermined gating pulse having delay and duration to switch on the gate circuit 87 for a predetermined duration of a horizontal line or lines comensurating with the timing and the duration of generation of the control signals. The control signals are fed from line 32L through gate circuit 87 to the level sensor 88 in a setup similarly to that explained above in connection with the control code extractors 76 and 76A. Similarly the control code extractor 77 can be fed with H and V signals by connecting it to a video line through a synchronizing separator circuit 82, such as the one shown in FIG. 6A, instead of feeding the incidence and duration timer 85 with P3. The incidence and duration timer 85 also outputs a clipping pulse CP5 for activating the control signal clipper 35 of the fiber transmitter 6 shown in FIG. 7.

It is apparent from the above descriptions that external synchronizing and/or control signals can be propagated via fiber optic cable between receiver-controller 11 or 90 and a fiber optic transmitter 6 for injecting the external synchronizing and/or the control signals into a transmission line 16T connecting a television camera 10 and a fiber transmitter 6 for propagating two way signals, video signals from the television camera 10 to the fiber transmitter 6 and external synchronizing and/or control signals to the television camera 10 via common connectors 16 and 18.

It is also apparent from the above descriptions that fiber optic cable 15 carrying video signals generated by television camera 12 to the receiver-controller 9 or 90 via fiber receiver 8 will propagate to the television camera 12 external synchronizing and/or control signals injected by the receiver-controller 9 or 90 into the transmission line 16R connecting the receiver-controller 9 or 90 and the fiber receiver 8 via common connectors 16 and 28.

It will also become apparent that the television camera 12 can be connected to the receiver-controller 11 or 90 by the using single fiber optic cable 15 for propagating the two way signals, the video signals to the receiver-controller 11 or 90 and the external synchronizing and/or the control signals to the television camera 12, and wherein the television camera will retrieve the external synchronizing pulse via comparator circuit 36 and the control code via control code extractor 77, while the clipping circuits 57 and 38 of the receiver-controller 11 or 90 will remove any return signals residuals to prevent closed signal loop and/or output signal level errors.

The external synchronizing and the control signal clipping circuits throughout this detailed description are referred to as individual circuits, however it is possible to utilize one clipping circuit to clip both the external synchronizing and the control signals by feeding two clipping pulses such as CP5 and P3 of FIG. 7, or CP4 and P3 of FIG. 8, or the sync counter 52 output pulse and P2 of FIG. 3, to a combined clipping circuit.

Referring again to FIGS. 3, 3A and 9, each of the external synchronizing generators 44 of the receiver-controllers 9, 11, 90 can be fed with master external synchronizing signals to drive synchronously a plurality of receiver-controllers 9, 11 or 90 in a monitoring system employing multiple receivers.

Similarly, it is also possible to synchronously drive the control and external synchronizing driver 24 of the fiber receiver 8 shown in FIG. 8 by feeding it through connector 44B with synchronizing drive signals outputted from the receiver controller 9 of FIG. 3 via connector 44A, instead of applying the extracted external synchronizing signal fed from the comparator circuit 62. It is also possible to feed a control signal outputted from the receiver-controller 9 of FIG. 3 via connector 49A to the control and external synchronizing driver 24 of FIG. 8 via connector 49B, instead of applying the output of the control code extractor 76A, thereby connecting television camera 10 to a fiber transmitter 6 via transmission line 16T and through common connectors 16 and 18, while the fiber receiver 8 connects to a receiver-controller 9 or 90 via individual connectors 44A, 49A and 16 of FIG. 8 and FIG. 9, to connectors 44B, 49B and 28 of the embodiment of FIG. 3, respectively.

The television camera 10 of FIG. 4 can be further connected to a fiber transmitter 6 of FIG. 7 via individual connectors 16, 18, 44C and 49C, feeding the video signal via transmission line 16T and through connectors 16 and 18 and the external synchronizing and/or the control signal via individual connectors 44C and 49C, respectively. Thereby providing for connecting the television camera 10 to a fiber optic line wherein the fiber receiver 8 of FIG. 8 processes two way signals, feeding video signals to transmission line 16R and extracting the external synchronizing and/or the control signal from the transmission line 16 for re-injecting the extracted signal into the fiber optic connector 27, and wherein the transmission line 16R is connected via common connectors 16 and 28 to the receiver-controller 9 or 90.

When using the individual connectors between the television camera 10 of FIG. 4 and the fiber transmitter 6 of FIG. 7 the control signal injector 37 and the external synchronizing signal injector 32 shown are not needed; similarly the control code extractor 76, the comparator circuit 62 and the reference signal source? 60 shown in FIG. 4 are not needed.

It is further apparent from above descriptions that all the systems shown in FIGS. 1A–FIG. 1E can be interconnected and applied in part or in whole and that in any of the system configuration shown at least one section of the line can be connected via common connectors and, moreover, no closed loop signals will affect the recombined two way signals.

The present invention can be applied not only to an information transmission line and fiber optic line apparatus used in a monitoring system but also to any other information propagating apparatuses.

It should be understood, of course, that the foregoing disclosure relates to only a preferred embodiment of the invention and that it is intended to cover all changes and modifications of the example of the invention herein chosen for the purpose of the disclosure, which modifications do not constitute departures from the spirit and scope of the invention herein chosen for the purpose of the disclosure, which modifications do not constitute departures from the spirit and scope of the invention.

What is claimed is:

1. A method for connecting a fiber optic line including one or more fiber optic cables and a fiber optic receiver to a transmission line carrying an information signal propagated from a transmitter via said fiber optic receiver toward a receiver in one direction and an external synchronizing signal from said receiver toward said transmitter in an opposite direction through a common connector connecting said fiber optic receiver with said transmission line and carrying bi-directional signals, the method comprising the steps of:

transmitting a pulse signal having a voltage level higher than a maximum voltage level of said information signal or lower than a minimum voltage level of said information signal to said fiber optic receiver over said transmission line as an external synchronizing signal by using blanking portions of the information signals;

separating said pulse signal transmitted over the transmission line from said information signal by comparing said transmitted pulse signal to a reference signal or voltage having predetermined level; and converting said separated pulse signal into optical signal for propagating said optical signal via said one or more fiber optic cables toward said transmitter.

2. A method as set forth in claim 1 and further comprising steps of:

removing said pulse signal from said information signal propagated from said transmitter toward said receiver by applying a clipping pulse commensurating with the time and duration of said pulse signal to a clipping circuit contained in said fiber optic receiver and/or said receiver and/or said transmitter, to thereby preventing closed loop signals and/or signal errors.

3. A method as set forth in claim 1, wherein said information signal is a composite video signal or a digital video signal.

4. A method as set forth in claim 3, wherein said pulse signal is opposite in polarity to an internal sync signal which is contained in each said information signal.

5. A method as set forth in claim 3, wherein said information signal is mixed with an audio signal.

6. A method as set forth in claim 3, wherein said information signal contains an identification signal pertaining to said transmitter.

7. A method as set forth in claim 3, wherein said information signal contains status and/or diagnostic data pertaining to said transmitter.

8. A method as set forth in claim 5 wherein said information signal further contains identification signal pertaining to said transmitter.

9. A method as set forth in claim 5, wherein said information signal further contains status and/or diagnostic data pertaining to said transmitter.

10. A method as set forth in claim 8, wherein said information signal further contains status and/or diagnostic data pertaining to said transmitter.

11. A method for connecting a fiber optic line including one or more fiber optic cables and a fiber optic transmitter to a transmission line carrying an information signal from a transmitter toward a receiver via said fiber optic transmitter in one direction and an external synchronizing signal from said receiver via said fiber optic transmitter toward said transmitter in an opposite direction through a common connector connecting said fiber optic transmitter with said transmission line and carrying bi-directional signals, the method comprising the steps of:

receiving an optical signal emitted over said one or more fiber optic cables to said fiber optic transmitter as an external synchronizing signal and converting said received optical signal into a pulse signal having a voltage level higher than a maximum voltage level of said information signal or lower than a minimum voltage level of said information signal; and applying said pulse signal to said transmission line for propagating said pulse signal to said transmitter as an external synchronizing signal by using blanking portions of the information signal.

12. A method as set forth in claim 11 and further comprising the steps of:

removing said pulse signal from said information signal propagated from said transmitter toward said receiver by applying a clipping pulse commensurating with the time and duration of said pulse signal to a clipping circuit contained in said fiber optic transmitter and/or said receiver, and/or said transmitter, thereby preventing closed loop signal and/or signal errors.

13. A method as set forth in claim 11 further comprising the steps of:

separating said pulse signal propagated over said transmission line from said information signal by comparing said bi-directional signals to a reference signal or voltage having a predetermined level; and applying said separated pulse to said transmitter.

14. A method as set forth in claim 11, wherein said information signal is a composite video signal or a digital video signal.

15. A method as set forth in claim 11, wherein said pulse signal is opposite in polarity to an internal sync signal which is contained in each of information signals.

16. A method as set forth in claim 14, wherein said information signal is mixed with an audio signal.

17. A method as set forth in claim 14, wherein said information signal contains an identification signal pertaining to said transmitter.

18. A method as set forth in claim 14, wherein said information signal contains status and/or diagnostic data pertaining to said transmitter.

19. A method as set forth in claim 16, wherein said information signal further contains an identification signal pertaining to said transmitter.

20. A method as set forth in claim 16, wherein said information signal further contains status and/or diagnostic data pertaining to said transmitter.

21. A method as set forth in claim 19, wherein said information signal further contains status and/or diagnostic data pertaining said transmitter.

22. A method for connection fiber optic line consisting of one or more fiber optic cables and fiber optic receiver to a transmission line carrying video signal propagated from a transmitter via said fiber optic receiver toward a receiver in one direction and control signal from said receiver toward said transmitter in an opposite direction through a common connector connecting said fiber optic receiver with said transmission line and carrying bi-directional signals, the method comprising the steps of:

generating and feeding a control signal during one or more predetermined horizontal scanning periods of said video signal to said fiber optic receiver over said transmission line during a vertical blanking portion of said video signal;

separating said control signal propagated over the transmission line from said video signal by detecting an envelope of said control signal during said predetermined one or more horizontal scanning periods of said video signal; and converting said separated control signal into an optical signal for propagating said optical signal via said one or more fiber optic cables toward said transmitter.

23. A method as set forth in claim 22 and further comprising the steps of:

removing said control signal from said video signal propagated from said transmitter toward said receiver by applying a clipping pulse commensurating with said one or more predetermined horizontal scanning period of said video signal to a clipping circuit contained in said fiber optic receiver and/or said receiver and/or said transmitter, thereby preventing closed loop signal and/or signal errors.

24. A method as set forth in claim 22, wherein said video signal is composite video signal or digital video signal.

25. A method as set forth in claim 22, wherein said video signal is mixed with audio signal.

26. A method as set forth in claim 22, wherein said video signal contains identification signal pertaining said transmitter.

27. A method as set forth in claim 22, wherein said video signal contains status and/or diagnostic data pertaining to said transmitter.

28. A method as set forth in claim 25, wherein said video signal further contains an identification signal pertaining to said transmitter.

29. A method as set forth in claim 25, wherein said video signal further contains status and/or diagnostic data pertaining to said transmitter.

30. A method as set forth in claim 28, wherein said information signal further contains status and/or diagnostic data pertaining to said transmitter.

31. A method for connection a fiber optic line including one or more fiber optic cables and a fiber optic transmitter to a transmission line carrying a video signal from a transmitter toward a receiver via said fiber optic transmitter in one direction and a control signal from said receiver via said fiber optic transmitter toward said transmitter in an opposite direction through a common connector connecting said fiber optic transmitter with said transmission line and carrying bi-directional signals, the method comprising the steps of:

emitting optical signal through said one or more fiber optic cables to said fiber optic transmitter during one or more predetermined horizontal scanning periods of said video signal as a signal for controlling said transmitter; receiving and converting said emitted optical signal into said control signal for propagating said control signal to said transmitter by injecting said control signal to said transmission line during said one or more predetermined horizontal scanning periods of vertical blanking portions of said video signal.

32. A method as set forth in claim 31 and further comprising the step of:

removing said control signal from said video signal propagated from said transmitter toward said receiver by applying a clipping pulse commensurating with said one or more predetermined horizontal scanning periods of said video signal to a clipping circuit contained in said fiber optic transmitter and/or said receiver and/or said transmitter, to thereby prevent closed loop signals and/or signal errors.

33. A method as set forth in claim 31, wherein said video signal is a composite video signal or a digital video signal.

34. A method as set forth in claim 33, wherein said video signal is mixed with an audio signal.

35. A method as set forth in claim 33, wherein said video signal contains an identification signal pertaining to said transmitter.

36. A method as set forth in claim 33, wherein said video signal contains status and/or diagnostic data pertaining to said transmitter.

37. A method as set forth in claim 34, wherein said video signal further contains identification signal pertaining to said transmitter.

38. A method as set forth in claim 34, wherein said video signal further contains status and/or diagnostic data pertaining to said transmitter.

39. A method as set forth in claim 38, wherein said video signal further contains status and/or diagnostic data pertaining to said transmitter.

40. A method for introducing a fiber optic line including one or more fiber optic cables terminated by a fiber optic receiver on one end and a fiber optic transmitter on the other end between first and second sections of a transmission line in combination with a receiver connected via said first section of said transmission line and via a first common connector to said fiber optic receiver and a transmitter connected via said second section of said transmission line and via a second common connector to said fiber optic transmitter, for propagating an information signal from said transmitter toward said receiver in one direction and an external synchronizing signal from said receiver toward said transmitter in an opposite direction, through said first and second common connectors carrying bi-directional signals, the method comprising the steps of:

transmitting a pulse signal having a voltage level higher than a maximum voltage level of said information signal or lower than a minimum voltage level of said information signal to said fiber optic receiver over said first section of said transmission line as an external synchronizing signal by using blanking portions of the information signals;

separating said pulse signal transmitted over said first section of said transmission line from said information signal by comparing said transmitted signal to a reference signal or voltage having predetermined level; and converting said separated pulse signal into an optical signal for emitting said optical signal via said one or more fiber optic cables toward said fiber optic transmitter;

receiving and reconverting said optical signal into a pulse signal having a voltage level higher than a maximum voltage level of said information signal or lower than a minimum voltage level of said information signal; and injecting said reconverted pulse signal into said second section of said transmission line for propagating said reconverted pulse signal toward said transmitter over said transmission line as an external synchronizing signal by using blanking portions of the information signals.

41. A method as set forth in claim 40, and further comprising the step of:

removing said pulse signal from said information signal propagated from said transmitter toward said receiver by applying a clipping pulse commensurating with the time and duration of said pulse signal to a clipping circuit contained in said fiber optic receiver and/or said fiber optic transmitter and/or said receiver and/or said transmitter, to thereby prevent closed loop signal and/or signal errors.

42. A method as set forth in claim 40, wherein said information signal is a composite video signal or a digital video signal.

43. A method as set forth in claim 42, wherein said pulse signal is opposite in polarity to an internal sync signal which is contained in each of said information signal.

44. A method as set forth in claim 42, wherein said information signal is mixed with audio signal.

45. A method as set forth in claim 42, wherein said information signal contains identification signal pertaining said transmitter.

46. A method as set forth in claim 42, wherein said information signal contains status and/or diagnostic data pertaining to said transmitter.

47. A method as set forth in claim 44, wherein said information signal further contains an identification signal pertaining to said transmitter.

48. A method as set forth in claim 44, wherein said information signal further contains status and/or diagnostic data pertaining to said transmitter.

49. A method as set forth in claim 47, wherein said information signal further contains status and/or diagnostic data pertaining to said transmitter.

50. A method for introducing a fiber optic line including one or more fiber optic cables terminated by a fiber optic receiver on one end and a fiber optic transmitter on the other end between first and second sections of a transmission line in combination with a receiver connected via said first section of said transmission line and via a first common connector to said fiber optic receiver and a transmitter connected via said second section of said transmission line and via a second common connector to said fiber optic transmitter for propagating a video signal from said transmitter toward said receiver in one direction and a control signal from said receiver toward said transmitter in an opposite direction, through said common connectors carrying bi-directional signals, comprising the steps of:

generating and feeding a control signal during one or more predetermined horizontal scanning periods of said video signal to said fiber optic receiver over said first section of said transmission line during a vertical blanking portion of said video signal;

separating said control signal propagated over said transmission line from said video signal by detecting an envelope of said control signal during said predetermined one or more horizontal scanning periods of said video signal;

converting said separated control signal into an optical signal for emitting said optical signal via said one or more fiber optic cables toward said fiber optic transmitter receiving said emitted optical signal; and reconverting said emitted optical signal into said control signal for propagating said control signal to said transmitter by injecting said control signal to said transmission line during said one or more predetermined horizontal scanning periods of vertical blanking portions of said video signal.

51. A method as set forth in claim 50, and further comprising the steps of:

removing said control signal from said video signal propagated from said transmitter toward said receiver by applying a clipping pulse commensurating with said one or more predetermined horizontal scanning periods of said video signal to a clipping circuit contained in said fiber optic receiver and/or said fiber optic transmitter and/or said receiver and/or said transmitter, thereby preventing closed loop signal and/or signal errors.

52. A method as set forth in claim 50, wherein said video signal a is composite video signal or digital video signal.

53. A method as set forth in claim 52, wherein said video signal is mixed with audio signal.

54. A method as set forth in claim 52, wherein said video signal contains identification signal pertaining to said transmitter.

55. A method as set forth in claim 52, wherein said video signal contains status and/or diagnostic data pertaining to said transmitter.

56. A method as set forth in claim 53, wherein said video signal further contains an identification signal pertaining to said transmitter.

57. A method as set forth in claim 53, wherein said video signal further contains status and/or diagnostic data pertaining to said transmitter.

58. A method as set forth in claim 56, wherein said video signal further contains status and/or diagnostic data pertaining to said transmitter.

59. A method for connecting a fiber optic line including one or more fiber optic cables and a fiber optic receiver to a transmission line carrying a video signal propagated from a transmitter via said fiber optic receiver toward a receiver in one direction and an external synchronizing along with control signals from said receiver toward said transmitter in an opposite direction through a common connector connecting said fiber optic receiver with said transmission line and carrying bi-directional signals, the method comprising the steps of;
   generating two distinct signals; of which one is a pulse signal having a voltage level higher than a maximum voltage level of said video signal or lower than a minimum voltage level of said video signal as said external synchronizing signal, and another is a control signal having predetermined different voltage levels distinct from those of said pulse signal level for feeding said pulse signal and said control signal to said transmission line at distinct different times;
   wherein said control signal generated during one or more predetermined horizontal scanning periods of said video signal, and said pulse signal are both fed to said fiber optic receiver over said transmission line by using vertical blanking portions of said video signal;
   separating said pulse signal and said control signal propagated over said transmission line from said video signal by comparing said propagated signal to a reference signal or voltage having a predetermined level and by time gating and detecting an envelope of said control signal during said predetermined one or more horizontal scanning periods of said video signal; and
   converting said separated pulse signal and said separated control signal into optical signals for emitting said optical signals via said one or more fiber optic cables toward said transmitter.

60. A method as set forth in claim 59 and further comprising the step of;
   removing said pulse signal and said control signal from said information signal propagated from said transmitter toward said receiver by applying clipping pulses commensurating with the time and duration of said pulse signal and said control signal to one or more clipping circuits contained in said fiber optic receiver and/or said receiver, and/or said transmitter, thereby preventing closed loop signal and/or signal errors.

61. A method as set forth in claim 59, wherein said video signal is composite video signal or digital video signal.

62. A method as set forth in claim 61, wherein said pulse signal is opposite in polarity to an internal sync signal which is contained in each of said video signals.

63. A method as set forth in claim 61, wherein said video signal is mixed with audio signal.

64. A method as set forth in claim 61, wherein said video signal contains an identification signal pertaining to said transmitter.

65. A method as set forth in claim 61, wherein said video signal contains status and/or diagnostic data pertaining to said transmitter.

66. A method as set forth in claim 63, wherein said video signal further contains an identification signal pertaining to said transmitter.

67. A method as set forth in claim 63, wherein said video signal further contains status and/or diagnostic data pertaining to said transmitter.

68. A method as set forth in claim 66, wherein said video signal further contains status and/or diagnostic data pertaining to said transmitter.

69. A method for connecting a fiber optic line including one or more fiber optic cables and a fiber optic transmitter to a transmission line carrying a video signal from a transmitter toward a receiver via said fiber optic transmitter in one direction and an external synchronizing along with control signals from said receiver via said fiber optic transmitter toward said transmitter in an opposite direction through common connector connecting said fiber optic transmitter with said transmission line and carrying bi-directional signals, comprising the steps of:
   receiving an optical signals emitted over said one or more fiber optic cables to said fiber optic transmitter composed of two distinct levels and distinct time incidence, a first level and time incidence for said external synchronizing signal and second level and time incidence for said control signals; and converting a received first level and time incidence optical signal into a pulse signal having a voltage level higher than a maximum voltage level of said video signal or lower than a minimum voltage level of said video signal and converting a received second level and time incidence optical signal into a control signal during one or more predetermined horizontal scanning periods of said video signal; and
   applying said converted pulse signal and said converted control signal to said transmission line for propagating both said pulse signal and said control signal to said transmitter as an external synchronizing signal along with said control signal by using vertical blanking portions of said video signal.

70. A method as set forth in claim 69, and further comprising the steps of:
   removing said pulse signal and said control signal from said video signal propagated from said transmitter toward said receiver by applying clipping pulses commensurating with the time and duration of said pulse signal and said control signal to one or more clipping circuits contained in said fiber optic transmitter and/or said receiver and/or said transmitter, to thereby prevent closed loop signal and/or signal errors.

71. A method as set forth in claim 69 wherein said video signal is a composite video signal or a digital video signal.

72. A method as set forth in claim 71, wherein said pulse signal is opposite in polarity to an internal sync signal which is contained in each of said video signal.

73. A method as set forth in claim 71, wherein said video signal is mixed with audio signal.

74. A method as set forth in claim 71, wherein said video signal contains an identification signal pertaining to said transmitter.

75. A method as set forth in claim 71, wherein said video signal contains status and/or diagnostic data pertaining to said transmitter.

76. A method as set forth in claim 73, wherein said video signal further contains an identification signal pertaining to said transmitter.

77. A method as set forth in claim 73, wherein said video signal further contains status and/or diagnostic data pertaining to said transmitter.

78. A method as set forth in claim 76, wherein said video signal further contains status and/or diagnostic data pertaining to said transmitter.

79. A method for introducing a fiber optic line including one or more fiber optic cables terminated by a fiber optic receiver on one end and a fiber optic transmitter on the other end between first and second sections of a transmission line in combination with a receiver connected via a first section of said transmission line and via a first common connector to said fiber optic receiver and a transmitter connected via a second section of said transmission line and via a common connector to said fiber optic transmitter for propagating a video signal from said transmitter toward said receiver in one direction and external synchronizing along with control signals from said receiver toward said transmitter in the opposite direction, through said common connectors carrying bi-directional signals, comprises the steps of:

generating two distinct signals; a pulse signal having a voltage level higher than a maximum voltage level of said video signal or lower than a minimum voltage level of said video signal as said external synchronizing signal, and another is a control signal having a predetermined different voltage level distinct from that of said pulse signal, for feeding said pulse signal and said control signal to said first section of said transmission line at distinct different times, wherein said control signal generated during one or more predetermined horizontal scanning periods of said video signal and said pulse signal are both fed to said fiber optic receiver over said transmission line by using vertical blanking portions of said video signal;

separating said pulse signal and said control signal propagated over said transmission line from said video signal by comparing said propagated signal to a reference signal or voltage having a predetermined level and by time gating and detecting an envelope of said control signal during said predetermined one or more horizontal scanning periods of said video signal; and converting said separated pulse signal and said separated control signal into optical signals for emitting said optical signals via said one or more fiber optic cables toward said fiber optic transmitter;

receiving said optical signals composed of two distinct levels and distinct time incidence, first level and time incidence for said external synchronizing signal and second level and time incidence for said control signals and converting said received first and time incidence optical signal into a pulse signal having a voltage level higher than a maximum voltage level of said video signal or lower than a minimum voltage level of said video signal and said second level and time incidence optical signal into said control signal during one or more predetermined horizontal scanning periods of said video signal; and applying said converted pulse signal and said converted control signal to said transmission line for propagating both said pulse signal and said control signal to said transmitter as an external synchronizing signal along with control signal by using vertical blanking portions of the video signal.

80. A method as set forth in claim 79, and further comprising the step of:

removing said pulse signal and said control signal from said video signal propagated from said transmitter toward said receiver by applying clipping pulses commensurating with the time and duration of said pulse signal and said control signal to one or more clipping circuits contained in said fiber optic receiver and/or said fiber optic transmitter and/or said receiver and/or said transmitter, to thereby prevent closed loop signals and/or signal errors.

81. A method as set forth in claim 79, wherein said video signal is a composite video signal or digital video signal.

82. A method as set forth in claim 81, wherein said pulse signal is opposite in polarity to an internal sync signal which is contained in each of said video signals.

83. A method as set forth in claim 81, wherein said video signal is mixed with audio signal.

84. A method as set forth in claim 81, wherein said video signal contains identification signal pertaining to said transmitter.

85. A method as set forth in claim 81, wherein said video signal contains status and/or diagnostic data pertaining to said transmitter.

86. A method as set forth in claim 83, wherein said video signal further contains an identification signal pertaining to said transmitter.

87. A method as set forth in claim 83, wherein said video signal further contains status and/or diagnostic data pertaining to said transmitter.

88. A method as set forth in claim 86, wherein said video signal further contains status and/or diagnostic data pertaining to said transmitter.

89. A fiber optic receiver apparatus for connecting one or more fiber optic cables and a fiber optic receiver to a transmission line carrying an information signal propagated from a transmitter via said one or more fiber optic cables and via said fiber optic receiver toward a receiver in one direction and an external synchronizing signal from said receiver toward said transmitter in an opposite direction through a common connector connecting said fiber optic receiver with said transmission line and carrying bi-directional signals, the apparatus comprising:

a circuit for receiving an optical information signal from said transmitter via said one or more fiber optic cables and for converting said optical information signal into electrical signal; and a circuit for processing said electrical signal into said information signal and for outputting said information signal via said common connector to said transmission line;

a circuit for retrieving a pulse signal having a voltage level higher than a maximum voltage level of said information signal or lower than a minimum voltage level of said information signal fed from said receiver through said transmission line via said common connector as an external synchronizing signal during blanking portions of said information signals, and for separating said pulse signal from said information signal by comparing a bi-directional signal to a reference signal or voltage having a predetermined level;

a circuit for processing said separated pulse signal; and a circuit for converting said processed pulse signal into an optical signal for emitting said optical signal via said one or more fiber optic cables toward said transmitter.

90. An apparatus as set forth in claim 89, and further comprising;

a circuit for clipping said pulse signal from said information signal fed to said common connector by applying a clipping pulse commensurating with the time and duration of said pulse signal to said clipping circuits, for preventing closed loop signals and/or signal errors from occurrence.

91. An apparatus according to claim 89, wherein said information signal is a composite video signal or a digital video signal.

92. An apparatus according claim 91, wherein said pulse signal is opposite in polarity to an internal sync signal which is contained in each of said information signals.

93. An apparatus according to claim 91, wherein said information signal is mixed with an audio signal.

94. An apparatus according to claim 91, wherein said information signal contains an identification signal pertaining to said transmitter.

95. An apparatus according to claim 91, wherein said information signal contains status and/or diagnostic data pertaining said transmitter.

96. An apparatus according to claim 93, wherein said information signal further contains identification signal pertaining to said transmitter.

97. An apparatus according to claim 93, wherein said information signal further contains status and/or diagnostic data pertaining to said transmitter.

98. An apparatus according to claim 96, wherein said information signal further contains status and/or diagnostic data pertaining to said transmitter.

99. A fiber optic transmitter apparatus for connecting one or more fiber optic cables and a fiber optic transmitter to a transmission line carrying an information signal from a transmitter toward a receiver via said fiber optic transmitter and via said one or more fiber optic cables in one direction and for propagating in an opposite direction an external synchronizing signal fed from said receiver via said fiber optic cables and via said fiber optic transmitter toward said transmitter through a common connector connecting said fiber optic transmitter with said transmission line and carrying bi-directional signals, the apparatus comprising;

a circuit for receiving an information signal from said transmitter via said transmission line and via said common connector;

a circuit for converting said received information signal into an optical signal and for emitting said optical signal through said one or more fiber optic cables to said receiver;

a circuit for receiving an optical external synchronizing signal from said receiver via said one or more fiber optical cables and for converting said optical external synchronizing signal into an electrical signal and a circuit for processing said electrical signal into a pulse signal having a voltage level higher than a maximum voltage level of said information signal or lower than a minimum voltage level of said information signal and for feeding said pulse signal as an external synchronizing signal during blanking portions of said information signals to said transmission line via said common connector.

100. An apparatus according to claim 99, and further comprising:

a clipping circuit for clipping said pulse signal from said information signal fed to said circuit for converting said received information signal by applying a clipping pulse commensurating with the time and duration of said pulse signal to said clipping circuit, for preventing closed loop signals and/or signal error from occurrence.

101. An apparatus according to claim 99, wherein said information signal is a composite video signal or a digital video signal.

102. An apparatus according to claim 101, wherein said pulse signal is opposite in polarity to an internal sync signal which is contained in each information signal.

103. An apparatus according to claim 101, wherein said information signal is mixed with an audio signal.

104. An apparatus according to claim 101, wherein said information signal contains an identification signal pertaining to said transmitter.

105. An apparatus according to claim 101, wherein said information signal contains status and/or diagnostic data pertaining to said transmitter.

106. An apparatus according to claim 103, wherein said information signal further contains identification signal pertaining to said transmitter.

107. An apparatus according to claim 103, wherein said information signal further contains status and/or diagnostic data pertaining said transmitter.

108. An apparatus according to claim 106, wherein said information signal further contains status and/or diagnostic data pertaining to said transmitter.

109. A fiber optic receiver apparatus for connecting one or more fiber optic cables and a fiber optic receiver to a transmission line carrying a video signal propagated from a transmitter via said one or more fiber optic cables and via said fiber optic receiver toward a receiver in one direction and a control signal from said receiver toward said transmitter in an opposite direction through a common connector connecting said fiber optic receiver with said transmission line and carrying bi-directional signals, the apparatus comprising:

a circuit for receiving an optical video signal from said transmitter via said one or more fiber optic cables and for converting said optical video signal into an electrical signal;

a circuit for processing said electrical signal into said video signal and for outputting said video signal via said common connector to said transmission line;

a circuit for retrieving said control signal generated by said receiver during one or more predetermined horizontal scanning periods of said video signal and fed to said fiber optic receiver over said transmission line through said common connector during a vertical blanking portion of said video signal and for separating said control signal propagated over the transmission line from said video signal by time gating and detecting an envelope of said control signal during said predetermined one or more horizontal scanning periods of said video signal;

a circuit for processing said separated control signal and a circuit for converting said separated control signal into an optical signal for emitting said optical signal via said one or more fiber optic cables toward said transmitter.

110. An apparatus as set forth in claim 109, and further comprising;
- a circuit for clipping said control signal from said video signal fed to said common connector by applying a clipping pulse commensurating with said one or more predetermined horizontal scanning periods of said video signal to said clipping circuit, for preventing closed loop signals and/or signal errors from occurrence.

111. An apparatus according to claim 109, wherein said video signal is a composite video signal or a digital video signal.

112. An apparatus according to claim 111, wherein said video signal is mixed with an audio signal.

113. An apparatus according to claim 111, wherein said video signal contains an identification signal pertaining to said transmitter.

114. An apparatus according to claim 111, wherein said video signal contains status and/or diagnostic data pertaining to said transmitter.

115. An apparatus according to claim 112, wherein said video signal further contains an identification signal pertaining to said transmitter.

116. An apparatus according to claim 112, wherein said video signal further contains status and/or diagnostic data pertaining to said transmitter.

117. An apparatus according to claim 115, wherein said video signal further contains status and/or diagnostic data pertaining to said transmitter.

118. A fiber optic transmitter apparatus for connecting one or more fiber optic cables and a fiber optic transmitter to a transmission line carrying a video signal from a transmitter toward a receiver via said fiber optic transmitter and via said one or more fiber optic cables in one direction and for propagating in an opposite direction a control signal fed from said receiver via said fiber optic cables and via said fiber optic transmitter toward said transmitter through a common connector connecting said fiber optic transmitter with said transmission line and carrying bi-directional signals, the apparatus comprising;
- a circuit for receiving a video signal from said transmitter via said transmission line and via said common connector; and
- a circuit for converting said received video signal into an optical signal and for emitting said optical signal through said one or more fiber optic cables to said receiver;
- a circuit for receiving an optical control signal from said receiver via said one or more fiber optic cables and for converting said optical control signal into an electrical signal; and
- a circuit for processing said electrical signal into said control signal during one or more predetermined horizontal periods of said video signal and for feeding said control signal during blanking portions of said video signals to said transmission line via said common connector.

119. An apparatus according to claim 118, further comprising;
- a circuit for clipping said control signal from said video signal fed to said circuit for converting said received video signal by applying a clipping pulse commensurating with said one or more predetermined horizontal periods of said video signal to said clipping circuit, for preventing closed loop signal and/or signal errors from occurrence.

120. An apparatus according to claim 118, wherein said video signal is a composite video signal or a digital video signal.

121. An apparatus according to claim 120, wherein said video signal is mixed with an audio signal.

122. An apparatus according to claim 120, wherein said video signal contains an identification signal pertaining to said transmitter.

123. An apparatus according to claim 120, wherein said video signal contains status and/or diagnostic data pertaining to said transmitter.

124. An apparatus according to claim 121, wherein said video signal further contains an identification signal pertaining to said transmitter.

125. An apparatus according to claim 121, wherein said video signal further contains status and/or diagnostic data pertaining to said transmitter.

126. An apparatus according to claim 124, wherein said video signal further contains status and/or diagnostic data pertaining to said transmitter.

127. A fiber optic receiver apparatus for connecting one or more fiber optic cables and to a fiber optic receiver to a transmission line carrying a video signal propagated from a transmitter via said one or more fiber optic cables and via said fiber optic receiver toward a receiver in one direction and external synchronizing signal along with a control signal from said receiver toward said transmitter in the opposite direction through common connector connecting said fiber optic receiver with said transmission line and carrying bi-directional signals, comprising;
- a circuit for receiving an optical video signal from said transmitter via said one or more fiber optical cables and for converting said optical video signal into an electrical signal;
- a circuit for processing said electrical signal into said video signal and for outputting said video signal via said common connector to said transmission line;
- a retrieving circuit for retrieving said external synchronizing signal along with said control signal generated by said receiver, wherein said external synchronizing signal is a pulse signal having a voltage level higher than a maximum voltage level of said video signal or lower than a minimum voltage level of said video signal and said control signal is a signal having predetermined different voltage levels distinct from those of said pulse signal level and is generated at a distinctly different time from said pulse signal and wherein said control signal is generated during one or more predetermined horizontal scanning periods of said video signal and wherein said pulse signal and said control signal are both fed to said fiber optic receiver over said transmission line during vertical blanking portions of said video signal;
- wherein said retrieving circuit separating said pulse signal and said control signal from said video signal by comparing said bi-directional signals to a reference signal or voltage having a predetermined level and by time gating and detecting an envelope of said control signal during said predetermined one or more horizontal scanning periods of said video signal; and
- a circuit for converting said separated pulse signal and said separated control signal into optical signals for emitting said optical signals via said one or more fiber optic cables toward said transmitter.

128. An apparatus according to claim 127, and further comprising;
one or more clipping circuits for clipping said pulse signal and said control signal from said video signal fed to said common connector by applying clipping pulses commensurating with the time and duration of said pulse signal and said control signal to said one or more clipping circuits for preventing closed loop signals and/or signal errors from occurrence.

129. An apparatus according to claim 127, wherein said video signal is a composite video signal or a digital video signal.

130. An apparatus according to claim 129, wherein said pulse signal is opposite in polarity to an internal sync signal which is contained in each of said video signals.

131. An apparatus according to claim 129, wherein said video signal is mixed with an audio signal.

132. An apparatus according to claim 129, wherein said video signal contains an identification signal pertaining to said transmitter.

133. An apparatus according to claim 129, wherein said video signal contains status and/or diagnostic data pertaining to said transmitter.

134. An apparatus according to claim 131, wherein said video signal further contains an identification signal pertaining to said transmitter.

135. An apparatus according to claim 131, wherein said video signal further contains status and/or diagnostic data pertaining to said transmitter.

136. An apparatus according to claim 134, wherein said video signal further contains status and/or diagnostic data pertaining said transmitter.

137. A fiber optic transmitter apparatus for connecting one or more fiber optic cables and a fiber optic transmitter to a transmission line carrying a video signal from a transmitter toward a receiver via said fiber optic transmitter and via said one or more fiber optic cables in one direction and for propagating in an opposite direction an external synchronizing signal along with a control signal fed from said receiver via said fiber optic cables and via said fiber optic transmitter toward said transmitter through a common connector connecting said fiber optic transmitter with said transmission line and carrying bi-directional signals, the apparatus comprising;
a circuit for receiving a video signal from said transmitter via said transmission line and via said common connector; and
a circuit for converting said received video signal into an optical signal and for emitting said optical signal through said one or more fiber optic cables to said receiver;
a circuit for receiving an optical external synchronizing signal and control signal from said receiver via said one or more fiber optic cables said received signals being composed of two distinct optical signals, and said receiving circuit converting said two distinct optical signals into two distinct electrical signals; and
a circuit for processing said electrical signal into two distinct signals;
wherein said external synchronizing signal is a pulse signal having a voltage level higher than a maximum voltage level of said video signal or lower than a minimum voltage level of said video signal and said control signal is a signal having predetermined different voltage levels distinct from said pulse signal level and is generated at distinctly different time from the said pulse signal and wherein said control signal is generated during one or more predetermined horizontal scanning periods of said video signal and wherein said circuit for processing said electrical signal feeds said pulse signal and said control signal to said transmission line via said common connector during vertical blanking portions of said video signal.

138. An apparatus as set forth in claim 137 and further comprising:
one or more clipping circuits for clipping said external synchronizing signal said and said control signal from said video signal fed to said circuit for converting said received video signal by applying clipping pulses commensurating with the time and duration of said pulse signal and said control signal to said one or more clipping circuits for preventing closed loop signals and/or signal errors from occurrence.

139. An apparatus according to claim 137, wherein said video signal is a composite video signal or a digital video signal.

140. An apparatus according to claim 139, wherein said pulse signal is opposite in polarity to an internal sync signal which is contained in each of said video signals.

141. An apparatus according to claim 139, wherein said video signal is mixed with an audio signal.

142. An apparatus according to claim 139, wherein said video signal contains an identification signal pertaining to said transmitter.

143. An apparatus according to claim 139, wherein said video signal contains status and/or diagnostic data pertaining to said transmitter.

144. An apparatus according to claim 141, wherein said video signal further contains identification signal pertaining said transmitter.

145. An apparatus according to claim 141, wherein said video signal further contains status and/or diagnostic data pertaining to said transmitter.

146. An apparatus according to claim 144, wherein said video signal further contains status and/or diagnostic data pertaining to said transmitter.

147. A fiber optic system connecting apparatus comprising:
a fiber optic receiver;
a fiber optic transmitter; and
one or more fiber optic cables connected to said fiber optic receiver on one end and to said fiber optic transmitter on the other end for connecting a fiber optic system to first and second sections of a transmission line in combination with a receiver connected via a first section of said transmission line and via a first common connector to said fiber optic receiver and a transmitter connected via a second section of said transmission line and via a second common connector to said fiber optic transmitter for propagating an information signal from said transmitter toward said receiver in one direction and an external synchronizing signal from said receiver toward said transmitter in the opposite direction, through said first and second common connectors carrying bi-directional signals;
a fiber optic transmitter including:
a circuit for receiving an information signal from said transmitter via said second section of said transmission line and via said common connector; and
a circuit for converting said received information signal into optical signal and for emitting said optical signal through said one or more fiber optic cables to said fiber optic receiver;

a circuit for receiving optical external synchronizing signal from said fiber optic receiver via said one or more fiber optic cables and for converting said optical external synchronizing signal into an electrical signal; and a circuit for processing said electrical signal into a pulse signal having a voltage level higher than a maximum voltage level of said information signal or lower than a minimum voltage level of said information signal and for feeding said pulse signal as an external synchronizing signal during blanking portions of said information signal to said second section of said transmission line via said second common connector;

said fiber optic receiver including:

a circuit for receiving an optical information signal from said fiber optic transmitter via said one or more fiber optic cables and for converting said optical information signal into an electrical signal;

a circuit for processing said electrical signal into said information signal and for outputting said information signal via first said common connector to said first section of said transmission line;

a circuit for retrieving a pulse signal having a voltage level higher than a maximum voltage level of said information signal or lower than a minimum voltage level of said information signal fed from said receiver through said first section of said transmission line via first said common connector as an external synchronizing signal during blanking portions of said information signal, and for separating said pulse signal from said information signal by comparing said bi-directional signal to a reference signal or voltage having predetermined level;

a circuit for processing said separated pulse signal and a circuit for converting said processed pulse signal into optical signal for emitting said optical signal via said one or more fiber optic cables toward said fiber optic transmitter.

148. An apparatus according to claim 147, further comprising:

one or more circuits for clipping said pulse signal from said information signal processed by said fiber optic transmitter and/or by said fiber optic receiver by applying a clipping pulse commensurating with the time and duration of said pulse signal to said one or more circuits for clipping for preventing closed loop signals and/or signal errors from occurrence.

149. An apparatus according to claim 147, wherein said information signal is a composite video signal or a digital video signal.

150. An apparatus according to claim 149, wherein said pulse signal is opposite in polarity to an internal sync signal which is contained in each information signal.

151. An apparatus according to claim 149, wherein said information signal is mixed with an audio signal.

152. An apparatus according to claim 149, wherein said information signal contains an identification signal pertaining to said transmitter.

153. An apparatus according to claim 149, wherein said information signal contains status and/or diagnostic data pertaining to said transmitter.

154. An apparatus according to claim 151, wherein said information signal further contains an identification signal pertaining to said transmitter.

155. An apparatus according to claim 151, wherein said information signal further contains status and/or diagnostic data pertaining said transmitter.

156. An apparatus according to claim 154, wherein said information signal further contains status and/or diagnostic data pertaining said transmitter.

157. A fiber optic system connecting apparatus comprising a fiber optic receiver, a fiber optic transmitter and one or more fiber optic cables to be connected to said fiber optic receiver on one end and to said fiber optic transmitter on the other end for connecting said fiber optic system to first and second sections of a transmission line in combination with a receiver connected via a first section of said transmission line and via a first common connector to said fiber optic receiver and a transmitter connected via a second section for said transmission line and via a second common connector to said fiber optic transmitter for propagating a video signal from said transmitter toward said receiver in one direction and a control signal from said receiver toward said transmitter in an opposite direction, through said first and second common connectors carrying bi-directional signals, said fiber optic transmitter including:

a circuit for receiving a video signal from said transmitter via said second section of said transmission line and via said second common connector;

a circuit for converting said received video signal into an optical signal and for emitting said optical signal through said one or more fiber optic cables to said fiber optic receiver;

a circuit for receiving optical control signal from said fiber optic receiver via said one or more fiber optic cables and for converting said optical control signal into electrical signal; and a circuit for processing said electrical signal into said control signal during one or more predetermined horizontal periods of said video signal and for feeding said pulse signal as an external synchronizing signal during blanking portions of said information signals to said second of said transmission line via said second common connector;

said fiber optic receiver including:

a circuit for receiving an optical video signal from said fiber optic transmitter via said one or more fiber optic cables and or converting said optical video signal into an electrical signal;

a circuit for processing said electrical signal into said video signal and for outputting said video signal via said first common connector to said first section of said transmission line;

a circuit for retrieving said control signal generated by said receiver during one or more predetermined horizontal scanning periods of said video signal and fed to said fiber optic receiver through said first section for said transmission line via said first common connector during the vertical blanking portion of said video signal and for separating said control signal propagated over the transmission line from said video signal by time gating and detecting an envelope of said control signal during said predetermined one or more horizontal scanning periods of said video signal;

a circuit for processing said separated control signal; and a circuit for converting said processed control signal into optical signal for emitting said optical signal via said one or more fiber optic cables toward said fiber optic transmitter.

158. An apparatus according to claim 157, further comprising;

one or more clipping circuits for clipping said control signal from said video signal processed by said fiber optic transmitter and/or by said fiber optic receiver by applying a clipping pulse commensurating with said one or more predetermined horizontal periods of said video signal to said one or more clipping circuits for preventing closed loop signal and/or signal errors from occurrence.

159. An apparatus according to claim 157, wherein said video signal is a composite video signal or a digital video signal.

160. An apparatus according to claim 159, wherein said video signal is mixed with an audio signal.

161. An apparatus according to claim 159, wherein said video signal contains an identification signal pertaining to said transmitter.

162. An apparatus according to claim 159, wherein said video signal contains status and/or diagnostic data pertaining to said transmitter.

163. An apparatus according to claim 160, wherein said video signal further contains an identification signal pertaining to said transmitter.

164. An apparatus according to claim 160, wherein said video signal further contains status and/or diagnostic data pertaining to said transmitter.

165. An apparatus according to claim 163, wherein said video signal further contains status and/or diagnostic data pertaining to said transmitter.

166. A fiber optic system connecting apparatus comprising a fiber optic receiver; a fiber optic transmitter one or more fiber optic cables to be connected to said fiber optic receiver on one end and to a fiber optic transmitter on the other end for connecting said fiver optic system to first and second sections of a transmission line in combination with a receiver connected via said first section of said transmission line and via common connector to said fiber optic receiver and a transmitter connected via said second section of said transmission line and via common connector to said fiber optic transmitter for propagating video signal from said transmitter toward said receiver in one direction and an external synchronizing signal along with a control signal from said receiver toward said transmitter in an opposite direction, through said first and second common connectors carrying bi-directional signals, said fiber optic transmitter including:
a circuit for receiving a video signal from said transmitter via said second section of said transmission line and via said second common connector;
a circuit for converting said received video signal into an optical signal and for emitting said optical signal through said one or more fiber optic cables to said fiber optic receiver;
a circuit for receiving an optical external synchronizing signal and a control signal as two distinct optical signals from said fiber optic receiver via said one or more fiber optic cables and for converting said two distinct optical signals into two distinct electrical signals and a circuit for processing said electrical signals into two distinct signals; wherein said external synchronizing signal is a pulse signal having a voltage level higher than a maximum voltage level of said video signal or lower than a minimum voltage level of said video signal and said control signal is a signal having predetermined different voltage levels distinct from those of said pulse signal level and is generated at distinctly different time from said pulse signal and wherein said control signal is generated during one or more predetermined horizontal scanning periods of said video signal and wherein said circuit for processing said electrical signal feeds said pulse signal and said control signal to said second section of said transmission line via said common connector during vertical blanking portions of said video signal;

said fiber optic receiver including:
a circuit for receiving an optical video signal from said fiber optic transmitter via said one or more fiber optic cables and for converting said optical video signal into an electrical signal;
a circuit for processing said electrical signal into said video signal and for outputting said video signal via said first common connector to said first section of said transmission line; and
a retrieving circuit for retrieving said external synchronizing signal and said control signal generated by said receiver compose as two distinct signals, wherein, said external synchronizing signal is a pulse signal having a voltage level higher than a maximum voltage level of said video signal or lower than a minimum voltage level of said video signal and said control signal is a signal having predetermined different voltage levels distinct from the level of said pulse signal and is generated at distinctly different time from that of said pulse signal and wherein said control signal is generated during one or more predetermined horizontal scanning periods of said video signal and wherein said pulse signal and said control signal are both fed to said fiber optic receiver over said first section of said transmission line during vertical blanking portions of said video signal;
wherein said retrieving circuit separates said pulse signal and said control signal from said video signal by comparing said bi-directional signals to a reference signal or voltage having predetermined level and by time gating and detecting the envelope of said control signal during said predetermined one or more horizontal scanning periods of said video signal; and
a circuit converting said separated pulse signal and said separated control signal into optical signals for emitting said optical signals via said one or more fiber optic cables toward said fiber optic transmitter.

167. An apparatus according to claim 166, and further comprising:
one or more clipping circuits for clipping said pulse signal and said control signal from said video signal processed by said fiber optic transmitter and/or by said fiber optic receiver by applying clipping pulses commensurating with the time and duration of said pulse signal and said control signal to said one or more clipping circuits for preventing closed loop signals and/or signal errors from occurrence.

168. An apparatus according to claim 166, wherein said video signal is composite video signal or digital video signal.

169. An apparatus according to claim 168, wherein said pulse signal is opposite in polarity to an internal sync signal which is contained in each of said video signals.

170. An apparatus according to claim 168, wherein said video signal is mixed with an audio signal.

171. An apparatus according to claim 168, wherein said video signal contains identification signal pertaining to said transmitter.

172. An apparatus according to claim 168, wherein said video signal contains status and/or diagnostic data pertaining said transmitter.

173. An apparatus according to claim 170, wherein said video signal further contains identification signal pertaining said transmitter.

174. An apparatus according to claim 170, wherein said video signal further contains status and/or diagnostic data pertaining to said transmitter.

175. An apparatus according to claim 173, wherein said video signal further contains status and/or diagnostic data pertaining to said transmitter.

176. An apparatus according to claim 89, wherein said transmitter is a television camera, and further comprising:
a circuit for processing a video signal generated by said television camera and a circuit for converting said processed video signal into an optical signal and for emitting said optical signal through said one or more fiber optic cables to said fiber optic receiver;
a circuit for receiving an optical external synchronizing signal from said fiber optic receiver via said one or more fiber optic cables and for converting said optical external synchronizing signal into an electrical signal, and a circuit for processing said electrical signal into a pulse signal having a voltage level higher than a maximum voltage level of said information signal or lower than a minimum voltage level of said information signal and for applying said pulse signal as an external synchronizing signal to said television camera during blanking portions of said information signals.

177. An apparatus according to claim 176, wherein said video signal is composite video signal or digital video signal.

178. An apparatus according to claim 177, wherein said pulse signal is opposite in polarity to an internal sync signal which is contained in each of said video signals.

179. An apparatus according to claim 177, wherein said television camera includes a circuit for injecting an audio signal and the video signal is mixed with said audio signal.

180. An apparatus according to claim 177, wherein said television camera includes a circuit for injecting an identification signal and said video signal contains an identification signal pertaining to said television camera.

181. An apparatus according to claim 180, wherein said circuit for injecting the identification signal is used for injecting status and/or diagnostic data signals pertaining to said television camera and said video signal contains status and/or diagnostic data pertaining to said television camera.

182. An apparatus according to claim 179, wherein said television camera includes a circuit for injecting identification code signals and said video signal further contains an identification signal pertaining to said television camera.

183. An apparatus according to claim 181, wherein said television camera includes a circuit for injecting an audio signal and said video signal is mixed with the audio signal.

184. An apparatus according to claim 183, wherein said video signal further contains identification and/or status and/or diagnostic data pertaining said television camera.

185. A transmitter apparatus according to claim 109, wherein said transmitter is a television camera, further comprising;
a circuit for processing a video signal generated by said television camera and a circuit for converting said processed video signal into optical signal and for emitting said optical signal through said one or more fiber optic cables to said fiber receiver;
a circuit for receiving an optical control signal from said fiber optic receiver via said one or more fiber optic cables and for converting said optical control signal into an electrical signal; and
a circuit for processing said electrical signal into said control signal during one or more predetermined horizontal periods of said video signal and for applying said control signal to said television camera during blanking portions of said video signal.

186. An apparatus according to claim 185, wherein said video signal is a composite video signal or a digital video signal.

187. An apparatus according to claim 186, wherein said television camera incorporates a circuit for injecting an audio signal and said video signal is mixed with the audio signal.

188. An apparatus according to claim 186, where said television camera includes a circuit for injecting an identification signal and said video signal contains and identification signal pertaining to said television camera.

189. An apparatus according to claim 188, wherein said circuit for injecting the identification signal is used for injecting status and/or diagnostic data signals pertaining to said television camera and said video signal contains status and/or diagnostic data pertaining to said television camera.

190. An apparatus according to claim 187, wherein said television camera incorporate a circuit for injecting identification code signals and said video signal further contains an identification signal pertaining to said television camera.

191. An apparatus according to claim 189, wherein said television camera incorporates a circuit for injecting an audio signal and said video signal is mixed with said audio signal.

192. An apparatus according to claim 191, wherein said video signal further contains identification and/or status and/or diagnostic data pertaining to said television camera.

193. An apparatus according to claim 127, wherein said transmitter is a television camera, further comprising;
a circuit for processing a video signal generated by said television camera and a circuit for converting said processed video signal into an optical signal and for emitting said optical signal through said one or more fiber optic cables to said fiber optic receiver;
a circuit for receiving an optical external synchronizing signal and a control signal from said fiber optic receiver via said one or more fiber optic cables as two distinct optical signals and for converting said two distinct optical signals into two distinct electrical signals and a circuit for processing said electrical signals into two distinct signals; wherein said external synchronizing signal is a pulse signal having a voltage level higher than a maximum voltage level of said video signal or lower than a minimum voltage level of said video signal and said control signal is a signal having predetermined different voltage levels distinct from said pulse of signal level and is generated at distinctly different time from that of said pulse signal and wherein said control signal is generated during one or more predetermined horizontal scanning periods of said video signal for applying said pulse signal and said control signal to said television camera during vertical blanking portions of said video signal.

194. An apparatus according to claim 193, wherein said video signal is composite video signal or digital video signal.

195. An apparatus according to claim 194, wherein said pulse signal is opposite in polarity to an internal sync signal which is contained in each of said video signals.

196. An apparatus according to claim 194, wherein said television camera includes a circuit for injecting an audio signal and said video signal is mixed with said audio signal.

197. An apparatus according to claim 194, wherein said television camera includes a circuit for injecting an identification signal and said video signal contains an identification signal pertaining to said television camera.

198. An apparatus according to claim 194, wherein said circuit for injecting the identification signal is used for injecting status and/or diagnostic data signals pertaining to said television camera and said video signal contains status and/or diagnostic data pertaining to said television camera.

199. An apparatus according to claim 196, wherein said television camera including a circuit for injecting identification code signals and said video signal further contains an identification signal pertaining to said television camera.

200. An apparatus according to claim 198, wherein said television camera includes a circuit for injecting an audio signal and said video signal is mixed with audio signal.

201. An apparatus according to claim 200, wherein said video signal further contains identification and/or status and/or diagnostic data pertaining to said television camera.

202. A receiver apparatus according to claim 99, wherein said receiver further comprising;
- a circuit for receiving an optical information signal from said fiber optic transmitter or from said transmitter via said one or more fiber optic cables and for converting said optical information signal into an electrical signal and a circuit for processing said electrical signal into said information signal and for outputting said information signal;
- a circuit for generating a pulse signal having a voltage level higher than a maximum voltage level of said information signal or lower than a minimum voltage level of said information signal as an external synchronizing signal during blanking portions of said information signal;
- a circuit for processing said pulse signal and a circuit for converting said processed pulse signal into an optical signal for emitting said optical signal via said one or more fiber optic cables toward said fiber optic transmitter or toward said transmitter during blanking portions of said information signal.

203. An apparatus according to claim 202, and further comprising;
- a clipping circuit for clipping said pulse signal from said information signal fed by said transmitter or by said fiber optic transmitter by applying clipping pulses commensurating with the time and duration of said pulse signal to said clipping circuit for preventing closed loop signal and/or signal errors from occurrence.

204. An apparatus according to claim 202, wherein said information signal is composite video signal or digital video signal.

205. An apparatus according to claim 204, wherein said pulse signal is opposite in polarity to an internal sync signal which is contained in each of said information signal.

206. An apparatus according to claim 204, wherein said information signal is mixed with an audio signal and said receiver further comprises an audio retrieving circuit for outputting said audio signal.

207. An apparatus according to claim 118, wherein said receiver further comprises:
- a circuit for receiving an optical video signal from said fiber optic transmitter or from a television camera via said one or more fiber optic cable and for converting said optical video signal into an electrical signal and a circuit for processing said electrical signal into a video signal and for outputting said video signal;
- a circuit for generating a control signal during one or more predetermined horizontal scanning periods of said video signal;
- a circuit for processing said control signal; and
- a circuit for converting said processed control signal into an optical signal for emitting said optical signal via said one or more fiber optic cables toward said fiber optic transmitter or toward said television camera during the vertical blanking period of said video signal.

208. An apparatus according to claim 207, and further comprising:
- a clipping circuit for clipping said control signal from said video signal fed by said transmitter of by said fiber optic transmitter by applying a clipping pulse commensurating with said one or more predetermined horizontal periods of said video signal to said clipping circuit for preventing closed loop signal and/or signal errors.

209. An apparatus according to claim 207, wherein said video signal is a composite video signal or digital video signal.

210. An apparatus according to claim 209, wherein said video signal is mixed with an audio signal and said receiver further comprises an audio retrieving circuit for outputting said audio signal.

211. An apparatus according to claim 209, wherein said video signal contains an identification signal pertaining to said transmitter and said receiver further comprises a circuit for retrieving said identification signal.

212. An apparatus according to claim 211, wherein said circuit for generating a control signal generates a mixed control signal by combining said retrieved identification signal with said control signal.

213. An apparatus according to claim 212, wherein said video signal is mixed with an audio signal and said receiver further comprises an audio retrieving circuit for outputting said audio signal.

214. An apparatus according to claim 137, wherein said receiver further comprises;
- a circuit for receiving an optical video signal from said fiber optic transmitter or from a television camera via said one or more fiber optic cables and for converting said optical video signal into electrical signal and a circuit for processing said electrical signal into video signal and for outputting said video signal;
- a circuit for generating said external synchronizing signal along with said control signal wherein said external synchronizing signal is a pulse signal having a voltage level higher than a maximum voltage level of said video signal or lower than a minimum voltage level of said video signal and said control signal is a signal having predetermined different voltage levels distinct from said pulse signal level and is generated at distinctly different time from said pulse signal and wherein said control signal is generated during one or more predetermined horizontal scanning periods of said video signal and wherein said pulse signal and said control signal are generated during vertical blanking portions of said video signal; and
- a circuit converting said pulse signal and said control signal into optical signals for emitting said optical signals via said one or more fiber optic cables toward said fiber optic transmitter or toward said television camera during the vertical blanking portions of said video signal.

215. An apparatus according to claim 214, and further comprising:
one or more clipping circuits for clipping said pulse signal and said control signal from said video signal fed by said transmitter or by said fiber optic transmitter by applying clipping pulses commensurating with the time and duration of said pulse signal and said control signal to said one or more clipping circuits for preventing closed loop signal and/or signal errors from occurrence.

216. An apparatus according to claim 214, wherein said video signal is a composite video signal or a digital video signal.

217. An apparatus according to claim 216, wherein said pulse signal is opposite in polarity to an internal sync signal which is contained in each of said video signal.

218. An apparatus according to claim 216, wherein said video signal is mixed with audio signal and said receiver further comprising an audio retrieving circuit for outputting said audio signal.

219. An apparatus according to claim 216, wherein said video signal contains identification signal pertaining said transmitter and said receiver further comprises a circuit for retrieving said identification.

220. An apparatus according to claim 219, wherein said circuit for generating a control signal generates a mixed control signal by combining said retrieved identification signal with said control signal.

221. An apparatus according to claim 220, wherein said video signal is mixed with an audio signal and said receiver further comprises an audio retrieving circuit for outputting said audio signal.

222. A receiver apparatus for connecting a plurality of transmitters through common connectors which are included in an information signal transmission system for propagating an information signal toward a receiver in one direction and an external synchronizing signal toward said transmitters in an opposite direction via transmission lines and/or fiber optic cables through fiber optic receivers and/or fiber optic transmitters and/or directly to said transmitters in combination with a selector for selectively connecting any one of information signals and/or for switching over from one of said information signals to another, the apparatus comprising;
a circuit for generating a pulse signal having a voltage level higher than a maximum voltage level of said information signal or lower than a minimum voltage level of said information signal as an external synchronizing signal during blanking portions of said information signals;
a selector circuit having plurality of input poles for receiving plurality of information signals from said plurality of transmitter and for selectively outputting an information signal;
one or more common connectors associated with said transmission lines each for connecting one of said fiber optic receivers or said transmitters to one of said input poles and/or one or more fiber optic connectors each for connecting one of said fiber optic transmitters or said transmitters to one of said input poles, wherein each of said fiber optic connectors provides for connecting one or more fiber optic cables;
a circuit for receiving an optical information signal from said fiber optic transmitter or from said transmitters via said one or more fiber optic cables and for converting said optical information signal into an electrical signal;
a circuit for processing said electrical signal into said information signal and for outputting said information signal to an input pole of said selector circuit;
a circuit for processing said pulse signal; and
a circuit for converting said processed pulse signal into optical signal for emitting said optical signal via said one or more fiber optic cables toward said fiber optic transmitter or toward said transmitter during blanking portions of said information signal; and
a circuit for feeding said pulse signal to said one or more transmission lines for propagating said external synchronizing signal toward said fiber optic receiver and/or toward said transmitter during blanking portions of said information signal.

223. An apparatus according to claim 222, and further comprising;
a clipping circuit for clipping said pulse signal from said information signal outputted from said selection circuit by applying clipping pulse commensurating with the time and duration of said pulse signal to said clipping circuit for preventing closed loop signal and/or signal error.

224. An apparatus according to claim 222, wherein said information signal is composite video signal or digital video signal.

225. An apparatus according to claim 224, wherein said pulse signal is opposite in polarity to an internal sync signal which is contained in each of said information signals.

226. An apparatus according to claim 224, wherein said information signal is mixed with an audio signal and said receiver further comprises an audio retrieving circuit for outputting said audio signal.

227. A receiver apparatus for connecting a plurality of transmitters through common connectors which are included in a video signal transmission system for propagating a video signal toward a receiver in one direction and a control signal toward said transmitters in an opposite direction via transmission lines and/or fiber optic cables via fiber optic receivers and/or fiber optic transmitters and/or directly to said transmitters in combination with a selector for selectively connecting any one of video signals or for switching over from one of said video signals to another, the apparatus comprising;
a circuit for generating a control signal during one or more predetermined horizontal scanning periods of said video signal;
a selector circuit having a plurality of input poles for receiving a plurality of video signals from said plurality of transmitters and for selectively outputting said video signal;
one or more common connectors associated with said transmission lines each for connecting one of said fiber optic receivers or said transmitters to one of said input pole; and/or one or more plurality of fiber optic connectors each for connecting one of said fiber optic transmitters or said transmitters to one of said input poles; wherein each of said fiber optic connectors provides for connecting one or more fiber optic cables;
a circuit for receiving an optical video signal from one of said fiber optic transmitters or from one of said transmitters via said one or more fiber optic cables and for converting said optical video signal into an electrical signal and a circuit for processing said electrical signal into said video signal and for outputting said video signal to an input pole of said selector circuit;
a circuit for processing said control signal;

a circuit for converting said processed control signal into an optical signal for emitting said optical signal via said one or more fiber optic cables toward said fiber optic transmitter or toward said transmitter during a vertical blanking period of said video signal; and a circuit for feeding said control signal to said one or more transmission lines for propagating said control signal toward fiber optic receiver and/or said transmitters during the vertical blanking period of said video signal.

228. An apparatus according to claim 227, and further comprising:

a clipping circuit for clipping said control signal from said video signal outputted from said selection circuit by applying clipping pulses commensurating with said one or more predetermined horizontal periods of said video signal to said clipping circuit for preventing closed loop signals and/or signal errors from occurrence.

229. An apparatus according to claim 227, wherein said video signal is a composite video signal or a digital video signal.

230. An apparatus according to claim 229, wherein said video signal is mixed with an audio signal and said receiver further comprises an audio retrieving circuit for outputting said audio signal.

231. An apparatus according to claim 209, wherein said video signal contains an identification signal pertaining to a respective transmitter and said receiver further comprises a circuit for retrieving said identification signal.

232. An apparatus according to claim 231, wherein said circuit for generating a control signal generates a mixed control signal by combining said retrieved identification signal with said control signal.

233. An apparatus according to claim 232, wherein said video signal is mixed with an audio signal and said receiver further comprises an audio retrieving circuit for outputting said audio signal.

234. A receiver apparatus for connecting a plurality of transmitters through common connectors which are included in a video signal transmission system for propagating video signals toward a receiver in one direction and an external synchronizing signal and a control signal toward said transmitters in an opposite direction via transmission lines and/or fiber optic cables via fiber optic receivers and/or fiber optic transmitters and/or directly to said transmitters in combination with a selector for selectively connecting any one of said video signals and/or for switching over from one of said video signals to another, the apparatus comprising:

a circuit for generating a pulse signal having a voltage level higher than a maximum voltage level of said video signal or lower than a minimum voltage level of said video signal as an external synchronizing signal during blanking portions of said video signal;

a circuit for generating a control signal during one or more predetermined horizontal scanning periods of said video signal;

a selector circuit having a plurality of input poles for receiving a plurality of video signals from said plurality of transmitters and for selectively outputting a video signal;

one or more common connectors associated with said transmission lines each for connecting one of said fiber optic receivers or said transmitters to one of said input poles and/or one or more fiber optic connectors each for connecting one of said fiber optic transmitters or said transmitters to one of said input poles; wherein each of said fiber optic connectors provides for connecting one or more fiber optic cables;

a circuit for receiving an optical video signal from one of said fiber optic transmitters or from said transmitters via said one or more fiber optic cables and for converting said optical video signal into an electrical signal;

a circuit for processing said electrical signal into said video signal and for outputting said video signal to an input pole of said selector circuit;

a circuit for processing said pulse signal and said control signal;

a circuit for converting said processed pulse and control signals into optical signals for emitting said optical signals via said one or more fiber optic cables toward said fiber optic transmitter or toward said transmitter during vertical blanking portions of said video signals; and one or more circuits for feeding said pulse signal and said control signal to said one or more transmission lines for propagating said external synchronizing signal and said control signal toward said transmitters and/or toward said fiber optic receivers during vertical blanking portions of said video signal.

235. An apparatus according to claim 234, and further comprising:

one or more clipping circuits for clipping said pulse signal and said control signal from said video signal outputted from said selection circuit by applying clipping pulses commensurating with the time and duration of said pulse signal and said control signal to said one or more clipping circuits for preventing closed loop signals and/or signal errors from occurrence.

236. An apparatus according to claim 234, wherein said video signal is a composite video signal or a digital video signal.

237. An apparatus according to claim 236, wherein said pulse signal is opposite in polarity to an internal sync signal which is contained in each of said video signals.

238. An apparatus according to claim 236, wherein said video signal is mixed with an audio signal and said receiver further comprises an audio retrieving circuit for outputting said audio signal.

239. An apparatus according to claim 236, wherein said video signal contains an identification signal pertaining to a respective transmitter and said receiver further comprises a circuit for retrieving said identification signal.

240. An apparatus according to claim 239, wherein said circuit for generating a control signal generates a mixed control signal by combining said retrieved identification signal with said control signal.

241. An apparatus according to claim 240, wherein said video signal is mixed with an audio signal and said receiver further comprises an audio retrieving circuit for outputting said audio signal.

* * * * *